(12) United States Patent
Segawa et al.

(10) Patent No.: US 10,288,126 B2
(45) Date of Patent: May 14, 2019

(54) TORQUE TRANSMISSION JOINT AND ELECTRIC POWER STEERING DEVICE

(71) Applicant: NSK LTD., Tokyo (JP)

(72) Inventors: Toru Segawa, Maebashi (JP); Ryou Oosawa, Maebashi (JP)

(73) Assignee: NSK LTD., Tokyo (JP)

( * ) Notice: Subject to any disclaimer, the term of this patent is extended or adjusted under 35 U.S.C. 154(b) by 109 days.

(21) Appl. No.: 15/327,453

(22) PCT Filed: Sep. 18, 2015

(86) PCT No.: PCT/JP2015/076807
§ 371 (c)(1),
(2) Date: Jan. 19, 2017

(87) PCT Pub. No.: WO2016/047643
PCT Pub. Date: Mar. 31, 2016

(65) Prior Publication Data
US 2017/0175821 A1 Jun. 22, 2017

(30) Foreign Application Priority Data

Sep. 26, 2014 (JP) .................. 2014-196240
Dec. 26, 2014 (JP) .................. 2014-265909
(Continued)

(51) Int. Cl.
*F16D 3/68* (2006.01)
*B62D 5/04* (2006.01)
(Continued)

(52) U.S. Cl.
CPC ............. *F16D 3/68* (2013.01); *B62D 5/04* (2013.01); *B62D 5/0454* (2013.01); *F16D 3/54* (2013.01); *F16D 3/74* (2013.01)

(58) Field of Classification Search
CPC ..... F16D 3/68; F16D 3/54; F16D 3/74; B62D 5/04; B62D 5/0454
(Continued)

(56) References Cited

U.S. PATENT DOCUMENTS

| 2,074,941 A | * | 3/1937 | Ricefield | ............... F16D 3/68 |
| | | | | 464/73 |
| 3,396,556 A | * | 8/1968 | Giegerich | ............... F16D 3/50 |
| | | | | 464/73 |

(Continued)

FOREIGN PATENT DOCUMENTS

| JP | 60-150161 U | 10/1985 |
| JP | 6-341451 A | 12/1994 |

(Continued)

OTHER PUBLICATIONS

Search Report dated Jul. 21, 2015, issued by the International Searching Authority in counterpart International Patent Application No. PCT/JP2015/062569 (PCT/ISA/210).
(Continued)

*Primary Examiner* — Jacob D Knutson
(74) *Attorney, Agent, or Firm* — Sughrue Mion, PLLC

(57) ABSTRACT

A driving-side transmission portion of an output shaft of an electric motor and a driven-side transmission portion of a worm shaft are coupled to each other via a torque transmission joint including an elastic member and a coupling such that the torque can be transmitted. One axial end portion of a coupling-side concave-convex portion of the coupling is engaged with a first driving-side concave-convex portion of the driving-side transmission portion with a gap in the circumferential direction, and the other axial end portion thereof is engaged with a first driven-side concave-convex portion of the driven-side transmission portion with a gap in the circumferential direction. The elastic member is provided between an axial center portion of the coupling-side
(Continued)

concave-convex portion, and a second driving-side concave-convex portion of the driving-side transmission portion and a second driven-side concave-convex portion of the driven-side transmission portion such that the torque can be transmitted respectively.

13 Claims, 19 Drawing Sheets

(30) Foreign Application Priority Data

| Feb. 12, 2015 | (JP) | 2015-024871 |
|---|---|---|
| Apr. 24, 2015 | (WO) | PCT/JP2015/062569 |
| Apr. 28, 2015 | (JP) | 2015-092092 |
| Sep. 2, 2015 | (JP) | 2015-172536 |

(51) Int. Cl.
  *F16D 3/54* (2006.01)
  *F16D 3/74* (2006.01)

(58) Field of Classification Search
  USPC .................................. 180/443, 444, 446
  See application file for complete search history.

(56) References Cited

U.S. PATENT DOCUMENTS

| 5,928,083 | A | * | 7/1999 | Monahan | F16D 3/68 |
| | | | | | 192/41 R |
| 6,431,601 | B2 | * | 8/2002 | Maekawa | B62D 1/192 |
| | | | | | 180/443 |
| 6,440,000 | B1 | * | 8/2002 | Asa | F16D 3/58 |
| | | | | | 464/147 |
| 6,648,763 | B2 | * | 11/2003 | Ash | F16D 3/58 |
| | | | | | 464/73 |
| 7,883,423 | B2 | * | 2/2011 | Kubota | F16D 3/68 |
| | | | | | 464/73 |
| 9,051,973 | B2 | * | 6/2015 | Nakagawa | B62D 5/0409 |
| 2002/0195893 | A1 | | 12/2002 | Kobayashi et al. | |
| 2008/0128195 | A1 | * | 6/2008 | Kubota | F16D 3/68 |
| | | | | | 180/444 |
| 2008/0280709 | A1 | * | 11/2008 | Gouadec | F16D 3/76 |
| | | | | | 474/94 |
| 2015/0041241 | A1 | | 2/2015 | Yoshikawa et al. | |
| 2015/0275946 | A1 | | 10/2015 | Ishizaki et al. | |
| 2015/0298733 | A1 | * | 10/2015 | Moriyama | B62D 5/0409 |
| | | | | | 180/444 |
| 2015/0354636 | A1 | * | 12/2015 | Kaneda | F16D 3/12 |
| | | | | | 464/93 |

FOREIGN PATENT DOCUMENTS

| JP | 2003-72563 A | 3/2003 |
|---|---|---|
| JP | 2004-251426 A | 9/2004 |
| JP | 2004-306898 A | 11/2004 |
| JP | 2007-263315 A | 10/2007 |
| JP | 2008-309260 A | 12/2008 |
| JP | 2009-51441 A | 3/2009 |
| JP | 2010-70044 A | 4/2010 |
| JP | 2010-124621 A | 6/2010 |
| JP | 2011-7216 A | 1/2011 |
| JP | 2012-131249 A | 7/2012 |
| JP | 2013-160241 A | 8/2013 |
| JP | 2013-173440 A | 9/2013 |
| JP | 2014-134286 A | 7/2014 |
| WO | 2014/129441 A1 | 8/2014 |

OTHER PUBLICATIONS

Written Opinion dated Jul. 21, 2015, issued by the International Searching Authority in counterpart International Patent Application No. PCT/JP2015/062569 (PCT/ISA/237).

Search Report dated Dec. 15, 2015, issued by the International Searching Authority in counterpart International Patent Application No. PCT/JP2015/076807 (PCT/ISA/210).

Written Opinion dated Dec. 15, 2015, issued by the International Searching Authority in counterpart International Patent Application No. PCT/JP2015/076807 (PCT/ISA/237).

Communication issued by the Japanese Patent Office dated Sep. 5, 2017 in counterpart Japanese Patent Application No. 2016-550330.

* cited by examiner

TORQUE TRANSMISSION JOINT AND ELECTRIC POWER STEERING DEVICE

TECHNICAL FIELD

The present invention relates to a torque transmission joint which is to be incorporated into various mechanical devices and used for transmission of torque between a driving shaft and a driven shaft. The present invention also relates to an electric power steering device which is to be used as a steering device of an automobile and is configured to use an electric motor as an auxiliary power source, thereby reducing a force necessary for a driver to operate a steering wheel.

BACKGROUND ART

When applying a steering angle to steered wheels of an automobile (generally, front wheels except for a special vehicle such as a forklift), a power steering device has been widely used as a device for reducing a force necessary for a driver to operate a steering wheel. As such power steering device, an electric power steering device configured to use an electric motor as an auxiliary power source has also been recently used. Various structures have been known for the electric power steering device. In any structure, auxiliary power of the electric motor is applied via a reducer to a rotary shaft configured to rotate in accordance with an operation of the steering wheel and to apply a steering angle to the steered wheels as it rotates. As the reducer, a worm reducer has been generally used. In the case of the electric power steering device using the worm reducer, a worm configured to rotate by the electric motor and a worm wheel configured to rotate together with the rotary shall are meshed with each other such that the auxiliary power of the electric motor can be transmitted to the rotary shaft. However, in the case of the worm reducer, when changing a rotational direction of the rotary shaft, an uncomfortable abnormal noise called as gear striking noise may be generated based on a backlash existing at the meshing portion of the worm and the worm wheel if any measure is not made.

As a structure of suppressing the generation of such gear striking noise, it has been considered to elastically press the worm toward the worm wheel by an elastic member such as a spring. FIGS. 21 and 22 show an example of the electric power steering device disclosed in Patent Document 1. A front end portion of a steering shaft 2 configured to rotate in a predetermined direction by a steering wheel 1 is rotatably supported within a housing 3, and a worm wheel 4 is fixed to this part. Worm teeth 5 configured to mesh with the worm wheel 4 are provided on an axially intermediate portion of a worm shaft 6, and both axial end portions of a worm 8 configured to rotate by an electric motor 7 are rotatably supported in the housing 3 by a pair of rolling bearings 9a, 9b such as deep groove ball bearings or the like. Further, a pressing piece 10 is externally fitted to a part of a tip portion of the worm shaft 6, which protrudes more than the rolling bearing 9a, and an elastic member such as a coil spring 11 is provided between the pressing piece 10 and the housing 3. By the coil spring 11, the worm teeth 5 provided on the worm shaft 6 are pressed toward the worm wheel 4 via the pressing piece 10. By this configuration, the backlash between the worm teeth 5 and the worm wheel 4 is suppressed to reduce the generation of the gear striking noise.

According to the conventional structure as described above, it is possible to suppress the generation of the gear striking noise at the meshing portion of the worm teeth 5 and the worm wheel 4. However, it is not possible to suppress an abnormal noise, which is to be generated at a coupling portion between a tip portion of an output shaft 12 of the electric motor 7 and a base end portion of the worm shaft 6. This is described as follows. According to the structure shown in the drawing, in order to couple the tip portion of the output shaft 12 of the electric motor 7 and the base end portion of the worm shaft 6 such that torque can be transmitted, the base end portion of the worm shaft 6 is formed with a spline hole 13 opening to a base end surface of the worm shaft 6. The tip portion of the output shaft 12 is formed with a spline shaft portion 14. The spline shaft portion 14 and the spline hole 13 are spline-engaged. Thereby, the output shaft 12 and the worm shaft 6 are coupled such that the torque can be transmitted.

If the spline shaft portion 14 and the spline hole 13 are spline-engaged without a circumferential gap (without the backlash), an abnormal noise is not generated at the coupling portion (the spline engagement portion) between the tip portion of the output shaft 12 and the base end portion of the worm shaft 6. However, in the actual situation, the backlash exists at the spline engagement portion. Particularly, when the backlash between the worm teeth 5 and the worm wheel 4 is suppressed by the structure as shown in FIG. 22, it is not possible to completely remove the backlash of the spline engagement portion because it is necessary to allow swingable displacement of the worm shaft 6. That is, there is a room for improvement for suppressing the abnormal noise.

Patent Document 2 discloses a structure where the output shaft of the electric motor and the worm shaft are coupled via a metallic power transmission member having a cylinder shape such that the worm shaft can be smoothly swingably displaced. In the invention disclosed in Patent Document 2, since the worm shaft is swingably displaced, the backlash exists at spline engagement portions between spline shaft portions (male spline) provided at both end portions of the power transmission member and spline holes (female spline) provided at respective end portions of the worm shaft and the output shaft of the electric motor, respectively. Therefore, there is a room for improvement in the aspect of suppressing the abnormal noise to be generated when changing the rotational direction of the rotary shaft.

Patent Document 3 discloses a star-shaped elastic shaft joint configured to couple a worm shaft of a worm gear mechanism and a motor shaft of an electric motor, which are concentrically positioned, where a star-shaped elastic member is interposed between a first joint member provided at an end of the motor shaft and a second joint member provided at an end of the worm shaft. Patent Document 4 discloses a shaft for a constant-velocity universal joint in which a low torque transmission portion having an elastic member and a high torque transmission portion having a gap are provided, and the elastic member and the gap are interposed between a concave groove of a first shaft member and a projection of a second shaft member inserted into a cylindrical part of the first shaft member. Patent Documents 3 and 4 disclose the techniques of suppressing rattling between the two shafts to reduce the vibrations or noise by the above configurations. However, since the elastic member is disposed at an axially overlapping position of the two shafts without using a coupling, an allowance of deviation between the two shafts at assembling is small, so that there is a room for improvement in the assembling efficiency.

PRIOR ART DOCUMENTS

Patent Documents

Patent Document 1: JP-A-2004-306898
Patent Document 2: JP-A-2012-131249

Patent Document 3: JP-A-2013-160241
Patent Document 4: JP-A-2011-7216

SUMMARY OF THE INVENTION

Problems to be Solved

The present invention has been made in view of the above circumstances, and an object of the present invention is to provide a structure of a torque transmission joint capable of reducing generation of an abnormal noise when changing a rotational direction of a driving shaft and having an excellent assembling ability.

Means for Solving the Problems

A torque transmission joint of a toque transmission joint and an electric power steering device of the present invention is configured to transmit torque between end portions of a driving shaft and a driven shaft arranged in series in an axial direction, and comprises:
- a coupling including a coupling-side concave-convex portion which is formed by alternately arranging concave portions and convex portions over an entire circumference on one of inner and outer peripheries;
- an elastic member made of an elastic material and including driving-side elastic pieces which are provided at a plurality of circumferential positions, and driven-side elastic pieces which are provided at a plurality of circumferential positions;
- a driving-side transmission portion including a driving-side concave-convex portion which is provided at the end portion of the driving shaft either directly or via another member and which is formed by alternately arranging concave portions and convex portions over an entire circumference on one of inner and outer peripheries, which faces the coupling-side concave-convex portion; and
- a driven-side transmission portion including a driven-side concave-convex portion which is provided at the end portion of the driven shaft either directly or via another member and which is formed by alternately arranging concave portions and convex portions over an entire circumference on one of inner and outer peripheries, which faces the coupling-side concave-convex portion.

The driving-side concave-convex portion and the driven-side concave-convex portion are arranged with being axially spaced.

One axial portion of the driving-side concave-convex portion is engaged with the coupling-side concave-convex portion with a circumferential gap being interposed therebetween (a gap is formed between the circumferential side surfaces of the convex portions configuring the driving-side concave-convex portion and the circumferential side surfaces of the convex portions configuring the coupling-side concave-convex portion, respectively), and an axially remaining portion of the driving-side concave-convex portion is engaged with the coupling-side concave-convex portion with each of the driving-side elastic pieces being interposed therebetween (each driving-side elastic piece is sandwiched between the circumferential side surfaces of the convex portions configuring the driving-side concave-convex portion and the circumferential side surfaces of the convex portions configuring the coupling-side concave-convex portion, respectively).

One axial portion of the driven-side concave-convex portion is engaged with the coupling-side concave-convex portion with a circumferential gap being interposed therebetween (a gap is formed between the circumferential side surfaces of the convex portions configuring the driven-side concave-convex portion and the circumferential side surfaces of the convex portions configuring the coupling-side concave-convex portion, respectively), and an axially remaining portion of the driven-side concave-convex portion is engaged with the coupling-side concave-convex portion with each of the driven-side elastic pieces being interposed therebetween (each driven-side elastic piece is sandwiched between the circumferential side surfaces of the convex portions configuring the driven-side concave-convex portion and the circumferential side surfaces of the convex portions configuring the coupling-side concave-convex portion, respectively).

In implementing the above-described torque transmission joint of the present invention, when the driving-side concave-convex portion (driven-side concave-convex portion) is provided at the member fixed to an end portion of the driving shaft (driven shaft), this member may be made of a material such as a synthetic resin, metal material like sintered metal or the like, which is more difficult to be elastically deformed than an elastic material configuring the elastic member, and this member may be provided at the end portion of the driving shaft (driven shaft) by interference fit or provided by spline fitting while press-fitting a female spline part (including serration of which a pitch is small) formed on an inner periphery of one of the member and the driving shaft (driven-shaft) into a male spline part formed on an outer periphery of the other of the member and the driving shaft with relative rotation and axial relative displacement being restricted.

In implementing the above-described torque transmission joint of the present invention, a circumferential dimension (circumferential thickness) of each of the driving-side elastic pieces may be greater than a circumferential gap between the one axial portion of the driving-side concave-convex portion and the coupling-side concave-convex portion (the gap between the facing circumferential side surfaces of the convex portions configuring the driving-side concave-convex portion and the convex portions configuring the coupling-side concave-convex portion). Also, a circumferential dimension of each of the driven-side elastic pieces may be greater than a circumferential gap between the one axial portion of the driven-side concave-convex portion and the coupling-side concave-convex portion.

In implementing the above-described invention, specifically, the coupling-side concave-convex portion may include a first coupling-side concave-convex portion which is formed at one axial end portion (an end portion at the driving shaft side), a second coupling-side concave-convex portion which is formed at the other axial end portion (an end portion at the driven shaft side), and a third coupling-side concave-convex portion which is formed at an axially intermediate portion. The first coupling-side concave-convex portion may be engaged with a portion of the driving-side concave-convex portion between one axial end portion and an intermediate portion thereof with each of the driving-side elastic pieces being interposed therebetween. The second coupling-side concave-convex portion may be engaged with a portion of the driven-side concave-convex portion between another axial end portion to an intermediate portion thereof with each of the driven-side elastic pieces being interposed therebetween. One axial end portion of the third coupling-side concave-convex portion may be engaged with the other axial end portion of the driving-side concave-convex portion with a circumferential gap being interposed therebetween, and the other axial end portion of the third coupling-side concave-convex portion may be engaged with one axial end portion of the driven-side concave-convex portion with a circumferential gap being interposed therebetween.

In implementing the above-described invention, the elastic member may include a driving-side elastic body which has each of the driving-side elastic pieces, and a driven-side elastic body which has each of the driven-side elastic pieces, the driving-side elastic body and the driven-side elastic body being separate bodies.

Further, the coupling may include a cylindrical part including the third coupling-side concave-convex portion which is formed on an inner periphery thereof, and a plurality of protrusions which are provided at a plurality of circumferentially equally spaced positions of both axial end portions of the cylindrical part and protrude in the axial direction to configure each of the first coupling-side concave-convex portion and the second coupling-side concave-convex portion. The driving-side elastic body may include the driving-side elastic pieces provided at a plurality of circumferential positions of an axial side surface of a circular ring-shaped coupling plate part. The driven-side elastic body may include the driven-side elastic pieces provided at a plurality of circumferential positions of an axial side surface of a circular ring-shaped coupling plate part. The plurality of protrusions configuring the first coupling-side concave-convex portion and the driving-side elastic pieces may be alternately arranged over an entire circumference with circumferential side surfaces thereof facing each other. The plurality of protrusions configuring the second coupling-side concave-convex portion and the driven-side elastic pieces may be alternately arranged over an entire circumference with circumferential side surfaces thereof facing each other.

Further, the driving-side concave-convex portion may be arranged to have a radial gap with the third coupling-side concave-convex portion of the coupling and with the plurality of protrusions configuring the first coupling-side concave-convex portion. The driven-side concave-convex portion may be arranged to have a radial gap with the third coupling-side concave-convex portion of the coupling and with the plurality of protrusions configuring the second coupling-side concave-convex portion.

Further, at least at one end portion of both axial end portions of the third coupling-side concave-convex portion, facing circumferential side surfaces of the convex portions configuring the third coupling-side concave-convex portion may be inclined in a direction of separating away from each other toward an end edge of the third coupling-side concave-convex portion.

Further, the driving-side elastic body may include the driving-side elastic pieces provided at a plurality of circumferential positions of an axial side surface of a circular ring-shaped coupling plate part, the driven-side elastic body includes the driven-side elastic pieces provided at a plurality of circumferential positions of an axial side surface of a circular ring-shaped coupling plate part. The coupling plate part of the driving-side elastic body may be arranged between an axial side surface of the driving-side transmission portion and one axial end face of the coupling, and the coupling plate part of the driven-side elastic body may be arranged between an axial side surface of the driven-side transmission portion and the other axial end face of the coupling.

Alternatively, in implementing the above-described present invention, for example, the driving-side concave-convex portion may include a first driving-side concave-convex portion formed at one axial half part (a half part at a further side relative to the driven shaft), and a second driving-side concave-convex portion formed at the other axial half part (a half part at a closer side relative to the driven shaft). The first driving-side concave-convex portion may be engaged with one axial end portion of the coupling-side concave-convex portion with a circumferential gap being interposed therebetween, and the second driving-side concave-convex portion may be engaged with one axial end side portion (a driving shaft side portion of an axial intermediate portion) of the coupling-side concave-convex portion with each of the driving-side elastic pieces being interposed therebetween. The driven-side concave-convex portion may include a first driven-side concave-convex portion formed at another axial half part (a half part at a further side relative to the driving shaft), and a second driven-side concave-convex portion formed at one axial half part (a half part at a closer side relative to the driving shaft). The first driven-side concave-convex portion may be engaged with another axial end portion of the coupling-side concave-convex portion with a circumferential gap being interposed therebetween, and the second driven-side concave-convex portion may be engaged with another axial end side portion (a driven shaft side portion of an axial intermediate portion) of the coupling-side concave-convex portion with each of the driven-side elastic pieces being interposed therebetween.

In implementing the present invention, the elastic member may be integrally formed by coupling the driving-side elastic pieces and the driven-side elastic pieces by a circular plate-shaped or circular wheel-shaped coupling plate part.

Further, at least at one end portion of both axial end portions of the coupling-side concave-convex portion, facing circumferential side surfaces of the convex portions configuring the coupling-side concave-convex portion are inclined in a direction of separating away from each other toward an end edge of the coupling-side concave-convex portion.

Further, each of the driving-side elastic pieces may be arranged adjacent to the first driving-side concave-convex portion in the axial direction, and each of the driven-side elastic pieces may be arranged adjacent to the first driven-side elastic pieces in the axial direction.

An electric power steering device of the present invention comprises:

a non-rotatable housing which is supported to a fixed part;

a steering rotary shaft which is provided to be rotatable relative to the housing and configured to be rotated by an operation of a steering wheel and to apply a steering angle to steered wheels according to the rotation;

a worm wheel which is supported to a part of the steering rotary shaft concentrically with the steering rotary shaft in the housing and configured to rotate together with the steering rotary shaft;

a worm which includes worm teeth provided on an axially intermediate portion of a worm shaft, wherein axial end portions of the worm shaft are respectively rotatably supported to the housing by bearings with the worm teeth being meshed with the worm wheel; and an electric motor which is configured to rotate the worm, wherein an output shaft of the electric motor and the worm shaft are connected by a torque transmission joint such that torque can be transmitted.

Particularly, the torque transmission joint is the torque transmission joint of the above-described invention. In this case, the output shaft of the electric motor corresponds to the driving shaft, and the worm shaft corresponds to the driven shaft.

In implementing the electric power steering device of the present invention, a preload applying mechanism configured to elastically press the worm toward the worm wheel may be provided between a tip portion of the worm shaft (an end portion opposite to a side coupled to the output shaft of the electric motor through the torque transmission joint) and the housing.

Effects of the Invention

According to the torque transmission joint and the electric power steering device of the present invention, it is possible to suppress generation of the abnormal noise when changing the rotational direction of the driving shaft.

That is, according to the present invention, the axial portions of the driving-side concave-convex portion and the driven-side concave-convex portion are respectively engaged with the coupling-side concave-convex portion with the circumferential gap being interposed therebetween, and the axially remaining portions of the driving-side concave-convex portion and the driven-side concave-convex portion are respectively engaged with the coupling-side concave-convex portion with the driving-side elastic piece and the driven-side elastic piece being interposed therebetween, which configure the elastic member made of the elastic material such as elastomer, for example rubber. Therefore, according to the present invention, when torque to be transmitted between the driving shaft and the driven shaft is relatively low, the rotation torque of the driving shaft is transmitted to the driven shaft via the elastic member.

In contrast, when the torque to be transmitted between the driving shaft and the driven shaft increases, each driving-side elastic piece and each driven-side elastic piece are elastically deformed (elastically crushed) in the circumferential direction. The circumferential side surfaces of the convex portions configuring the axial portion of the driving-side concave-convex portion of the driving shaft and the circumferential side surfaces of the convex portion configuring the coupling-side concave-convex portion of the coupling directly collide (contact) each other, and the circumferential side surfaces of the convex portions configuring the coupling-side concave-convex portion and the circumferential side surfaces of the convex portions configuring the axial portion of the driven-side concave-convex portion of the driven shaft directly collide (contact) each other. Since the collision momentums are weakened by the elastic member, it is possible to suppress generation of the abnormal noise such as gear striking noise at the contact portion between the respective concave-convex portions, which is to be caused as the collision occurs. At this state, most of the rotation torque of the driving shaft is transmitted to the coupling by the engagement between the axial portion of the driving-side concave-convex portion and the coupling-side concave-convex portion, and most of the torque transmitted to the coupling is transmitted to the driven shaft by the engagement portion between the coupling-side concave-convex portion and the axial portion of the driven-side concave-convex portion. That is, according to the present invention, it is possible to divide the transmission characteristic of the torque between the driving shaft and the driven shaft into at least two stages in accordance with the magnitude of the torque to be transmitted.

Further, since the driving-side concave-convex portion and the driven-side concave-convex portion are arranged with being axially spaced, the coupling-side concave-convex portion of the coupling faces the driving-side concave-convex portion and the driven-side concave-convex portion at the axially spaced positions, respectively. Thereby, an allowance of the shaft deviation between the driving shaft and the driven shaft at assembling is increased, so that it is possible to improve the assembling property.

BRIEF DESCRIPTION OF THE DRAWINGS

FIG. 74 is an end view showing a coupling.

DETAILED DESCRIPTION OF EMBODIMENTS

First Embodiment

Figure 21:
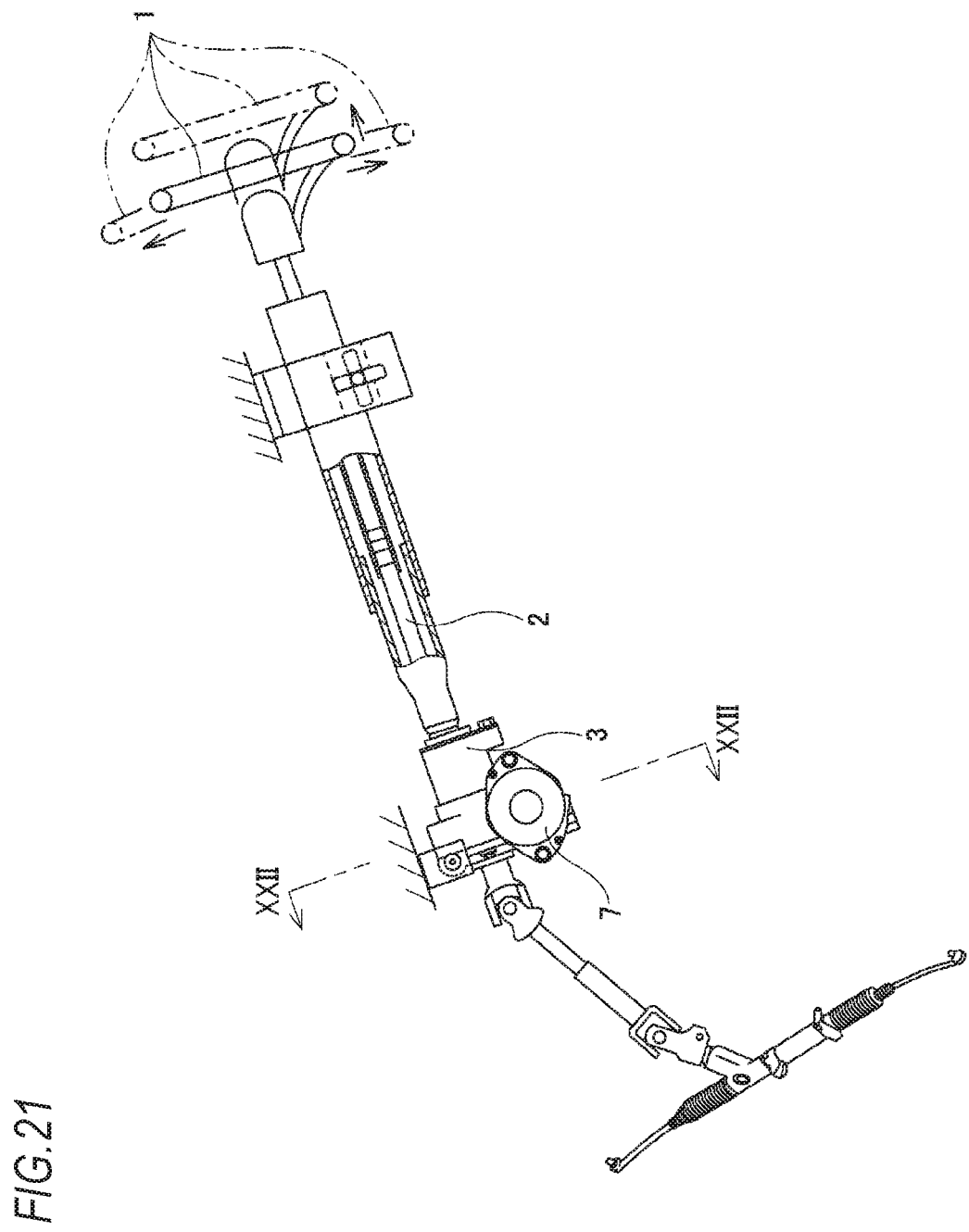
FIG. 21 is a partially longitudinal side view showing an example of a steering device of an automobile.
Figure 22:
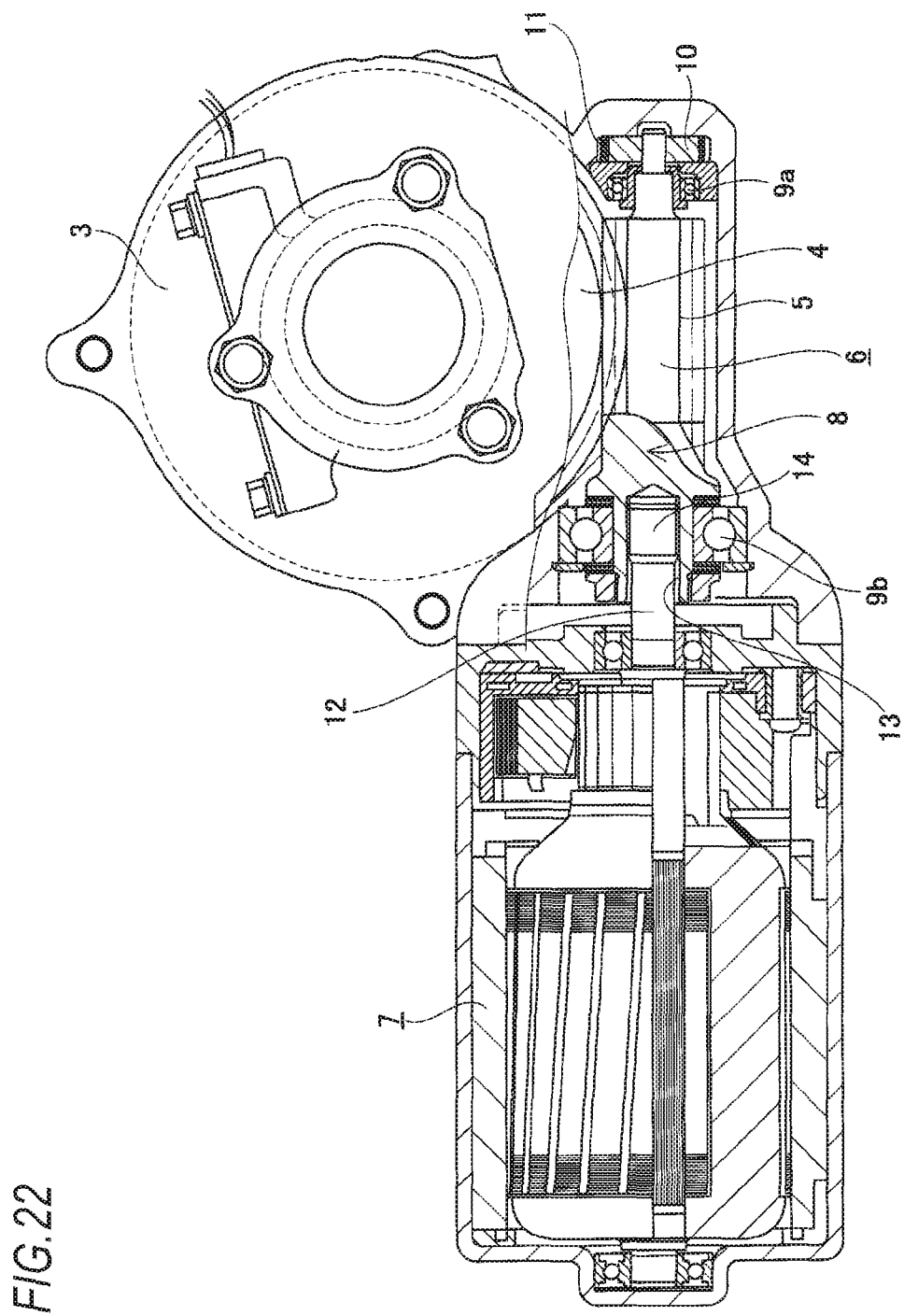
FIG. 22 is an enlarged sectional view of a XXII-XXII of FIG. 21, showing an example of a conventional structure of an electric power steering device.

FIGS. 1 to 8 show a first embodiment of the present invention. The features of the present invention, including the first embodiment, are to implement a structure capable of suppressing generation of an abnormal noise such as gear striking noise when changing a rotational direction of an output shaft, which is a driving shaft, of an electric motor. In an electric power steering device of the first embodiment, a front end portion of a steering shaft 2 configured to rotate in a predetermined direction by a steering wheel 1 is rotatable supported within a housing 3, and a worm wheel 4 is fixed to this part, similarly to the conventional structure shown in FIGS. 21 and 22. Worm teeth 5 configured to mesh with the worm wheel 4 are provided on an axially intermediate portion of a worm shaft 6a. Both axial end portions of a worm 8 configured to rotate by an electric motor 7 are rotatably supported in the housing 3 by a pair of rolling bearings 9a, 9b. Further, a preload applying mechanism 15 is provided, between the rolling bearing 9a externally fitted to a tip portion of the worm shaft 6a and the housing 3, and the worm teeth 5 provided on the worm shaft 6a are pressed toward the worm wheel 4. By this configuration, the backlash between the worm teeth 5 and the worm wheel 4 is suppressed to reduce generation of the gear striking noise.

In the first embodiment, a tip portion of an output shaft 12a of the electric motor 7 and a base end portion of the worm shaft 6a are coupled via a torque transmission joint 16 such that torque can be transmitted. The torque transmission joint 16 has a driving-side transmission portion 20, a driven-side transmission portion 26, a coupling 30, and an elastic member 18.

The driving-side transmission portion 20 is provided at the tip portion of the output shaft 12a by externally fitting a driving-side transmission member 19, which is provided separately from an output shaft main body 17 of the output shaft 12a, onto a tip portion of the output shaft main body 17 by interference fit with relative rotation and axial relative displacement being restricted (such that the torque can be transmitted). Alternatively, the driving-side transmission portion 20 is provided by spline fitting while press-fitting a female spline part (including serration of which a pitch is small) formed on an inner periphery of the driving-side transmission member 19 into a male spline part formed at the tip portion of the output shaft main body 17 with relative rotation and axial relative displacement being restricted. The driving-side transmission member 19 is made of a material such as a synthetic resin, sintered metal or the like, which is more difficult to be elastically deformed than an elastic material configuring the elastic member 18 such as elastomer, for example rubber.

Figure 5A:
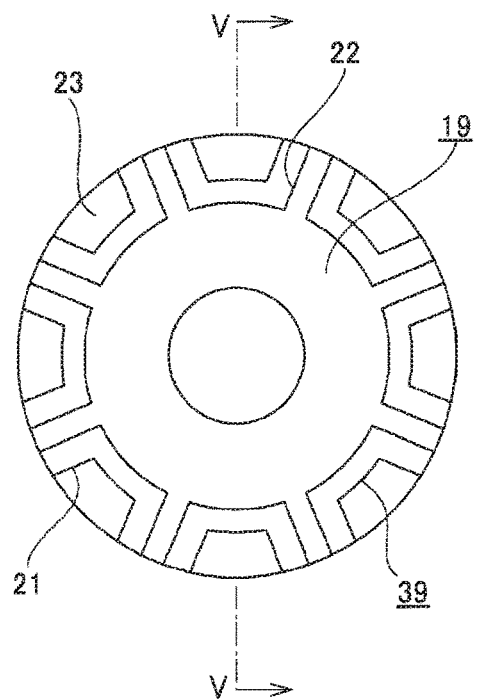
FIG. 5A is an end view showing a driving-side transmission member.
Figure 5B:
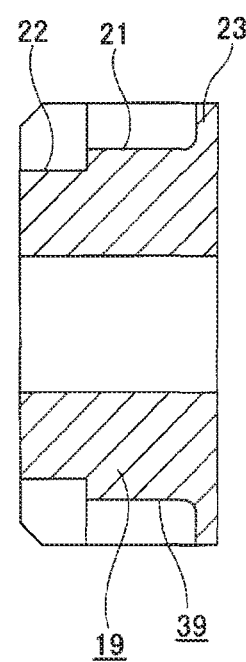
FIG. 5B is a sectional view taken along a V-V line of FIG. 54.

As shown in FIGS. 5A and 5B, an outer periphery of the driving-side transmission member 19 is provided with a driving-side concave-convex portion 39 formed by alternately arranging concave portions and convex portions over an entire circumference thereof. In the first embodiment, the driving-side concave-convex portion 39 is configured by a first driving-side concave-convex portion 21 provided at one axial half part (a right half part in FIGS. 1 to 3), which is a half part distant from the worm shaft 6a, and a second driving-side concave-convex portion 22 provided at the other axial half part (a left half part in FIGS. 1 to 3), which is a half part close to the worm shaft. An interval (circumferential width dimension) between facing circumferential side surfaces of the convex portions configuring the second driving-side concave-convex portion 22 is greater than an interval between facing circumferential side surfaces of the convex portions configuring the first driving-side concave-convex portion 21, and an outer diameter dimension of a bottom of the concave portion configuring the second driving-side concave-convex portion 22 is smaller than an outer diameter dimension of a bottom of the concave portion configuring the first driving-side concave-convex portion 21. An outer periphery of one axial end portion (a right end portion in FIGS. 1 to 3) of the driving-side transmission member 19 is provided with a driving-side collar portion 23 over an entire circumference thereof, which blocks one axial opening of (the concave portion configuring) the first driving-side concave-convex portion 21.

The driven-side transmission portion 26 is provided at the base end portion of the worm shaft 6a by externally fitting a driven-side transmission member 25, which is provided separately from a worm shaft main body 24 of the worm shaft 6a, onto a base end portion of the worm shaft main body 24 by interference fit, spline fitting or the like with relative rotation and axial relative displacement being restricted. The driven-side transmission member 25 is made of a material which is more difficult to be deformed than the elastic material configuring the elastic member 18.

Figure 6A:
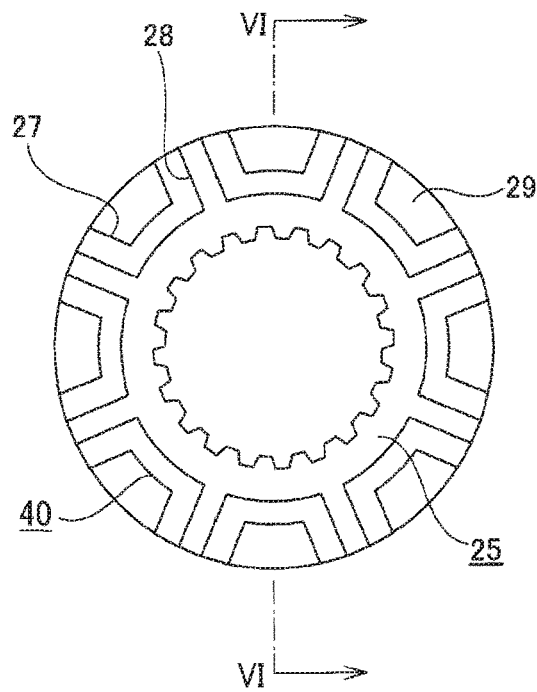
FIG. 6A is an end view showing a driven-side transmission member.
Figure 6B:
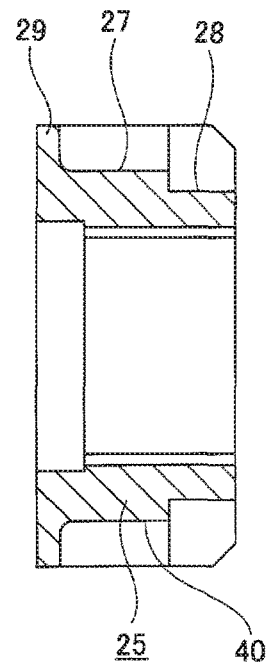
FIG. 6B is a sectional view taken along a VI-VI line of FIG. 6A.

As shown in FIGS. 6A and 6B, an outer periphery of the driven-side transmission member 25 is provided with a driven-side concave-convex portion 40 formed by alternately arranging concave portions and convex portions over an entire circumference thereof. In the first embodiment, the driven-side concave-convex portion 40 is configured by a first driven-side concave-convex portion 27 provided at other axial half part, which is a half part distant from the output shaft 12a, and a second driven-side concave-convex portion 28 provided at one axial half part, which is a half part close to the output shaft 12a. An interval between facing circumferential side surfaces of the convex portions configuring the second driven-side concave-convex portion 28 is greater than an interval between facing circumferential side surfaces of the convex portions configuring the first driven-side concave-convex portion 27, and an outer diameter dimension of a bottom of the concave portion configuring the second driven-side concave-convex portion 28 is smaller than an outer diameter dimension of a bottom of the concave portion configuring the first driven-side concave-convex portion 27. An outer periphery of the other axial end portion of the driven-side transmission member 25 is provided with a driven-side collar portion 29 over an entire circumference thereof, which blocks the other axial opening of (the concave portion configuring) the first driven-side concave-convex portion 27. An inner periphery of the driven-side transmission member 25 is formed with a female spline groove.

The driving-side concave-convex portion 39 and the driven-side concave-convex portion 40 are arranged with being axially spaced. In the first embodiment, the first driving-side concave-convex portion 21 of the driving-side concave-convex portion 39 and the first driven-side concave-convex portion 27 of the driven-side concave-convex portion 40 have outer diameter shapes of the substantially same dimensions, and the second driving-side concave-convex portion 22 of the driving-side concave-convex portion 39 and the second driven-side concave-convex portion 28 of the driven-side concave-convex portion 40 also have outer diameter shapes of the substantially same dimensions.

Figure 7A:
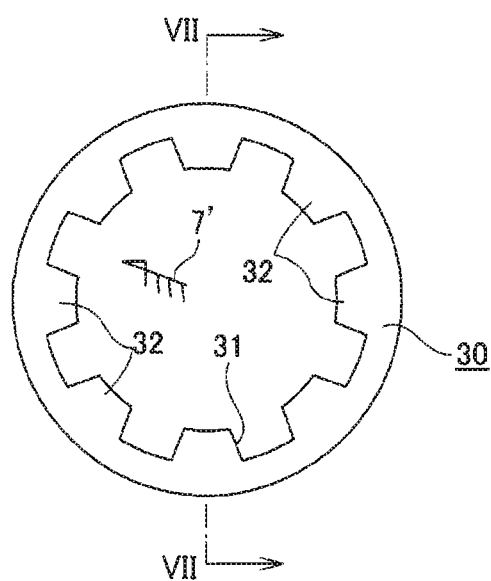
FIG. 7B is a sectional view taken along a VII-VII line of FIG. 7A.
FIG. 7C is a view as seen from a VII' arrow direction of FIG. 7A.
Figure 7B:
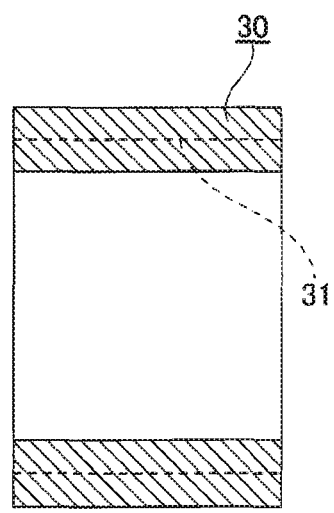
Figure 7C:
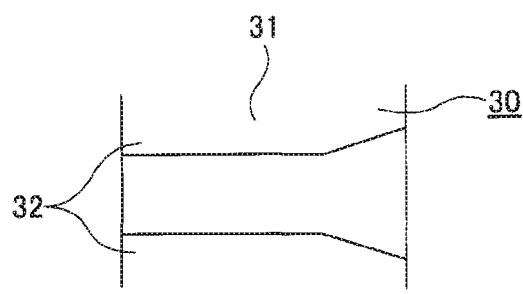

As shown in FIGS. 7A to 7C, the coupling 30 has a cylindrical shape as a whole, and an inner periphery thereof is provided with a coupling-side concave-convex portion 31 formed by alternately arranging concave portions and convex portions over an entire circumference thereof. One axial end portion of the coupling-side concave-convex portion 31 is engaged with the first driving-side concave-convex portion 21 of the driving-side concave-convex portion 39 with a circumferential gap (backlash) being interposed therebetween (with a gap t being formed between circumferential side surfaces of the convex portion configuring the first driving-side concave-convex portion 21 and the convex portion configuring the coupling-side concave-convex portion 31 (refer to FIG. 4A). The other axial end portion of the coupling-side concave-convex portion 31 is engaged with the first driven-side concave-convex portion 27 of the driven-side concave-convex portion 40 with a circumferential gap being interposed therebetween (with a gap being formed between circumferential side surfaces of the convex portion configuring the first driven-side concave-convex portion 27 and the convex portion configuring the coupling-side concave-convex portion 31). In the meantime, the circumferential gap between the coupling-side concave-convex portion 31 and the first driving-side concave-convex portion 21 and the circumferential gap between the coupling-side concave-convex portion 31 and the first driven-side concave-convex portion 27 can be set to arbitrary dimensions (the gaps may be the same or may be different).

In the first embodiment, as shown in FIG. 7C, at one axial end portion of the coupling-side concave-convex portion 31, which is an engagement portion with the first driving-side concave-convex portion 21, facing circumferential side surfaces of the convex portions 32, 32 configuring the coupling-side concave-convex portion 31 are inclined in a direction of separating away from each other toward one axial side (a width dimension between both circumferential side surfaces becomes greater toward one axial side). In contrast, facing circumferential side surfaces of the convex portions configuring the first driving-side concave-convex portion 21 to be engaged with the coupling-side concave-convex portion 31 are configured as flat surfaces of which an interval therebetween is constant over the axial direction. The coupling 30 is made of a synthetic resin such as polyacetal resin, polyamide resin or the like or a material such as iron-based metal such as carbon steel, light alloy such as aluminum-based alloy, or the like, which are more difficult (have higher stiffness) to be elastically deformed, as compared to elastomer such as rubber. The coupling 30 is sandwiched between inner surfaces of the driving-side collar portion 23 and the driven-side collar portion 29 facing each other, with being mounted between the driving-side transmission portion 20 and the driven-side transmission portion 26.

Figure 8A:
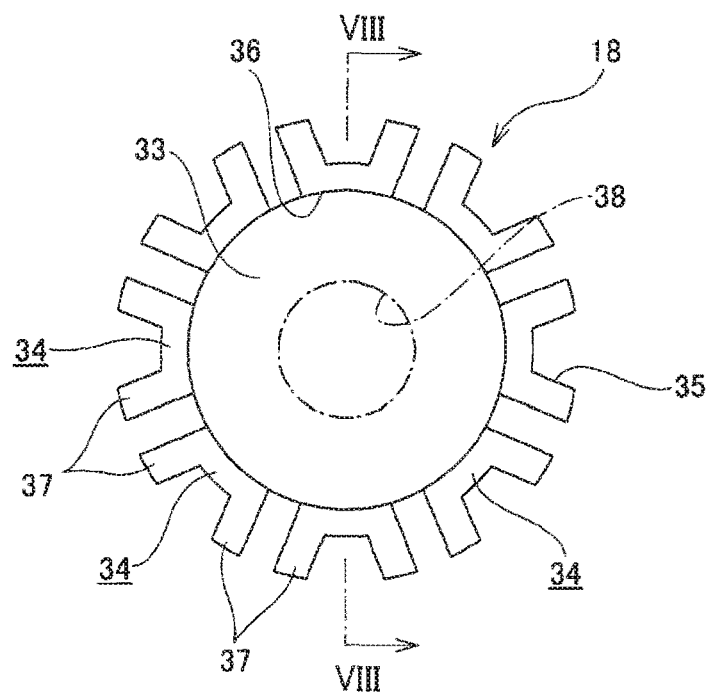
FIG. 8A is an end view showing an elastic member.
Figure 8B:
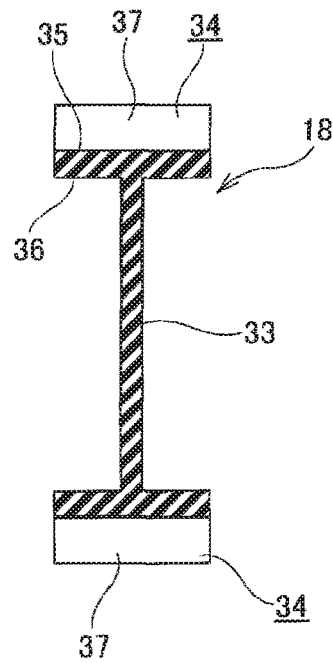
FIG. 8B is a sectional view taken along a VIII-VIII line of FIG. 8A.
Figure 9:
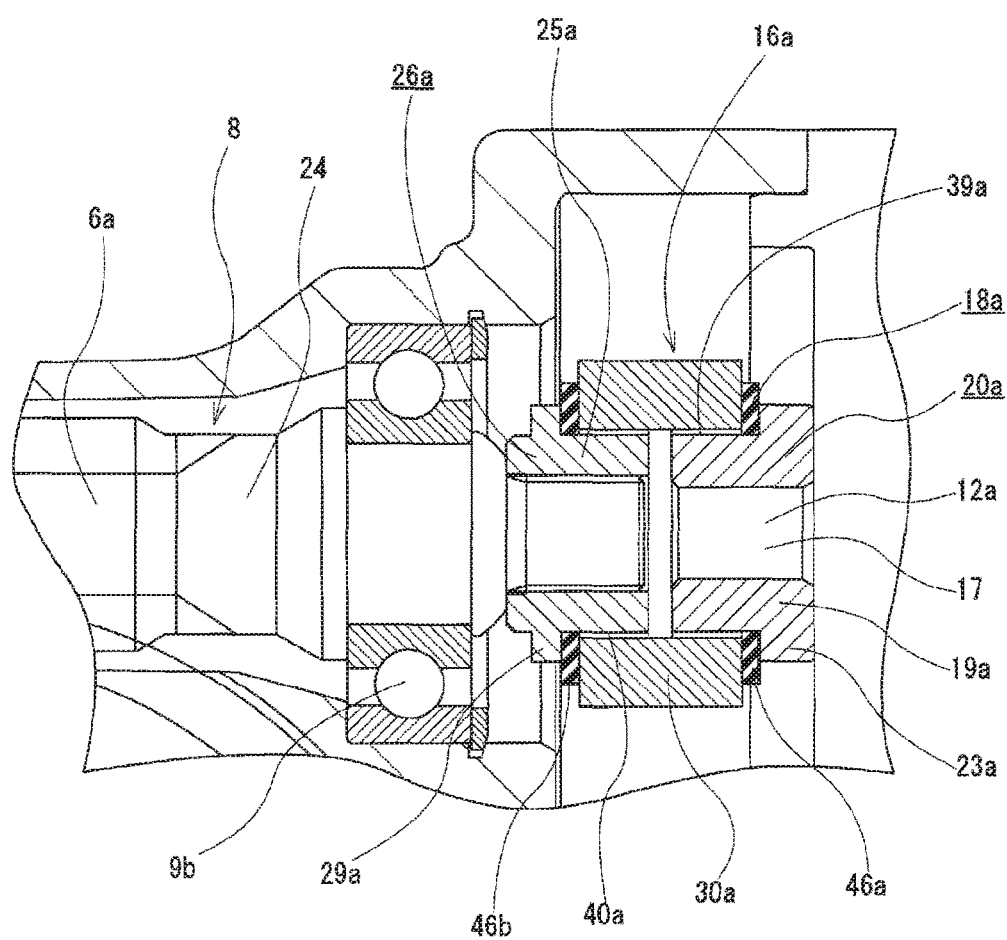
FIG. 9 is a similar view to FIG. 3, showing second and third embodiments of the present invention.
Figure 10A:
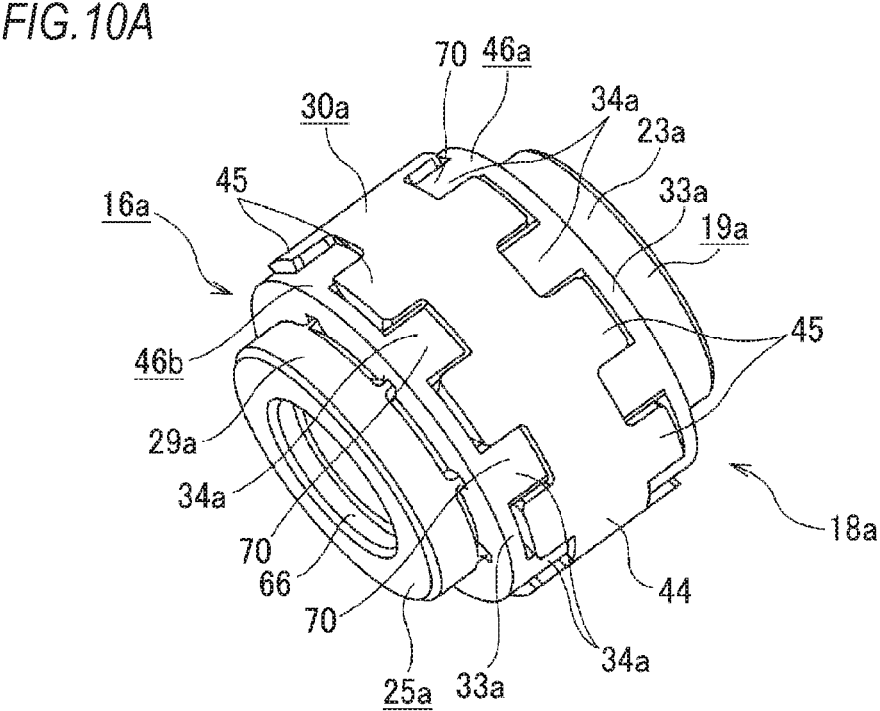
FIG. 10A is a perspective view showing a torque transmission joint of FIG. 9.
Figure 10B:
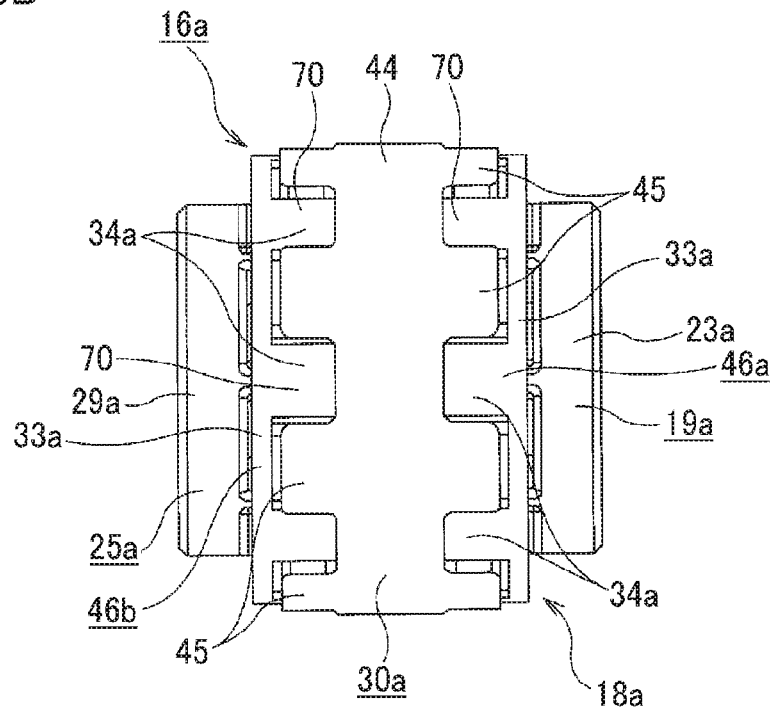
FIG. 10B is a side view of the torque transmission joint.

As shown in FIG. 8, the elastic member 18 is integrally formed as a whole by an elastic material such as elastomer, for example, rubber, and engagement pieces 34, 34 having a U-shaped end face shape (an outer periphery is recessed toward a radially inner side) are supported at a plurality of circumferential positions of an outer periphery of a disc-shaped coupling plate part 33 extending radially. An outer periphery of the elastic member 18 is provided with an outer diameter-side concave-convex portion 35, and a part of an inner periphery deviating axially from the coupling plate part 33 is provided with an inner diameter-side concave-convex portion 36. That is, the outer diameter-side concave-convex portion 35 has concave portions, which are portions recessed toward the radially inner side of outer peripheries of the respective engagement pieces 34, 34, and convex portions, which are portions (portions including a pair of circumferential wall portions 37, 37) between inner surfaces of the circumferential wall portions 37, 37 of the adjacent engagement pieces 34, 34. In the meantime, the inner diameter-side concave-convex portion 36 has concave portions, which are portions between the adjacent engagement pieces 34, 34, and convex portions, which are inner diameter-side portions of the respective engagement pieces 34, 34.

Figure 1:
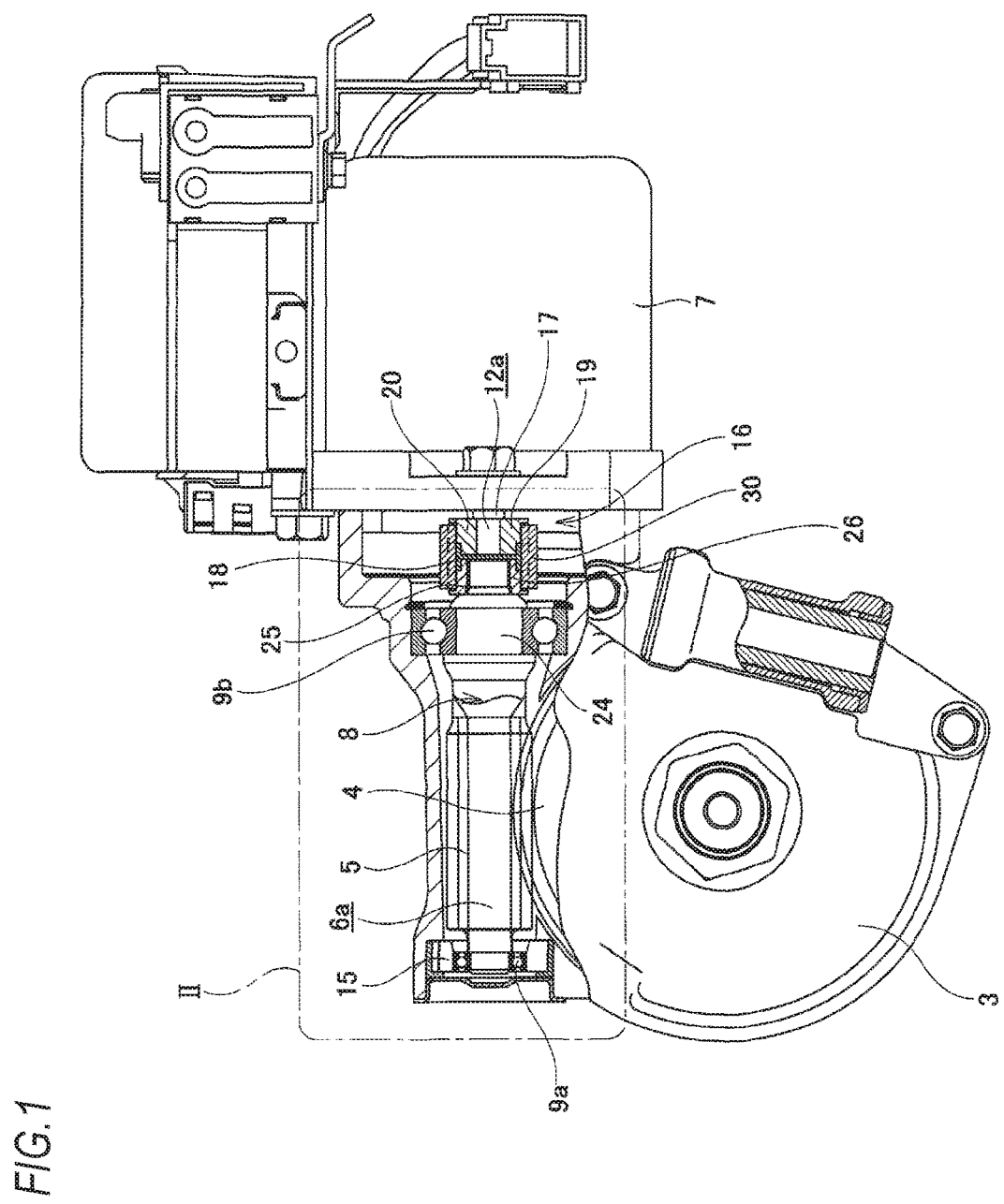
FIG. 1 is a partially cut side view showing a first embodiment of the present invention.
Figure 2:
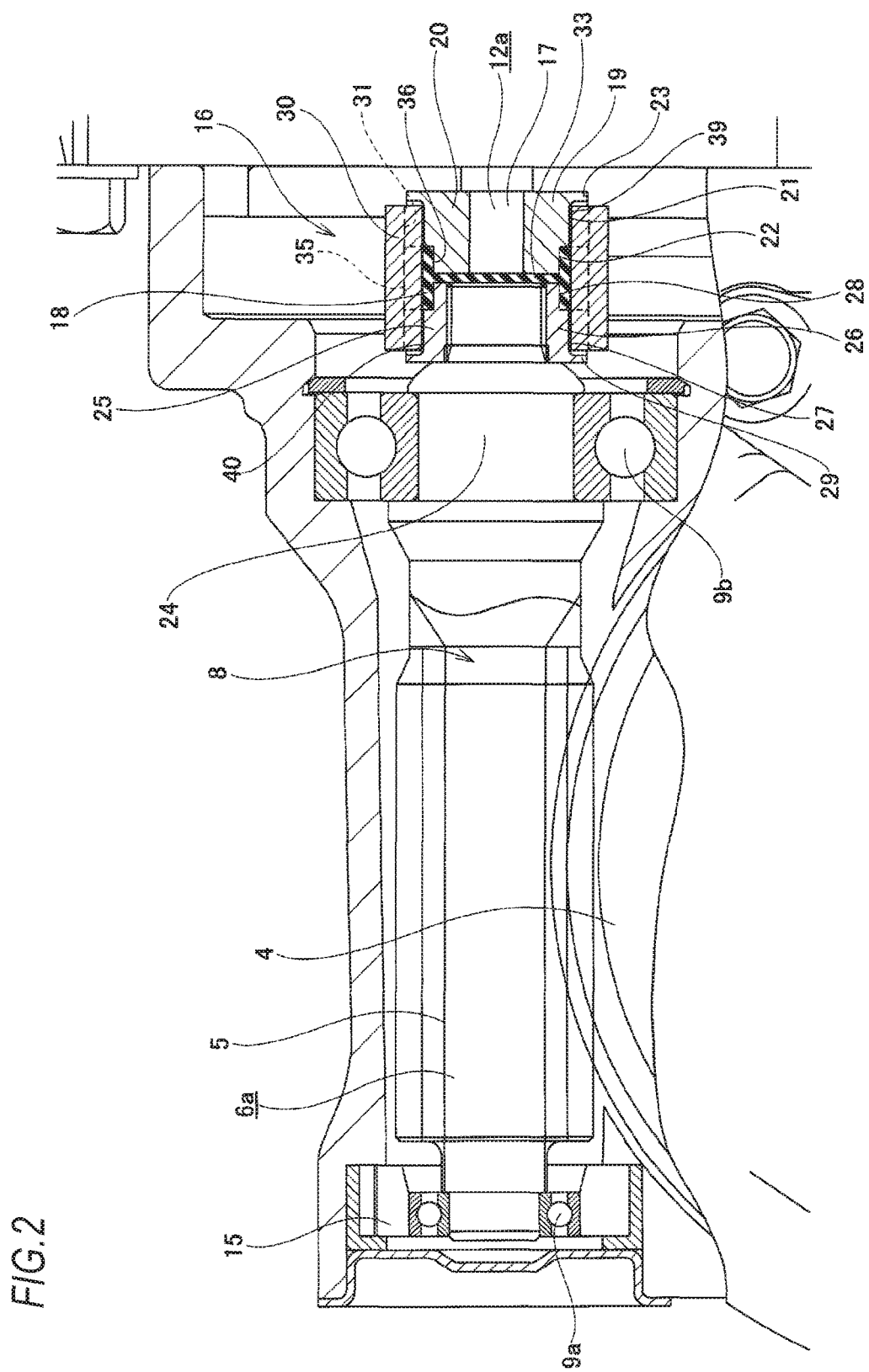
FIG. 2 is an enlarged view of a II part of FIG. 1.
Figure 3:
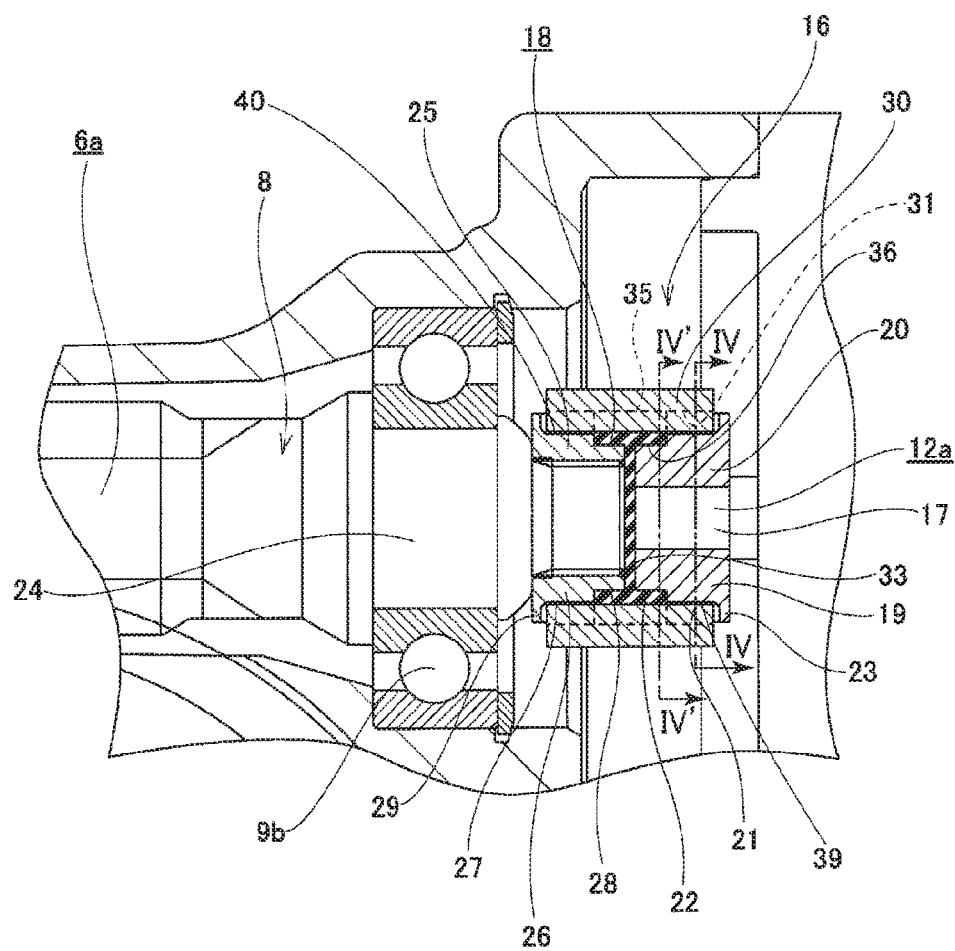
FIG. 3 is an enlarged view of a right part of FIG. 2.
Figure 4A:
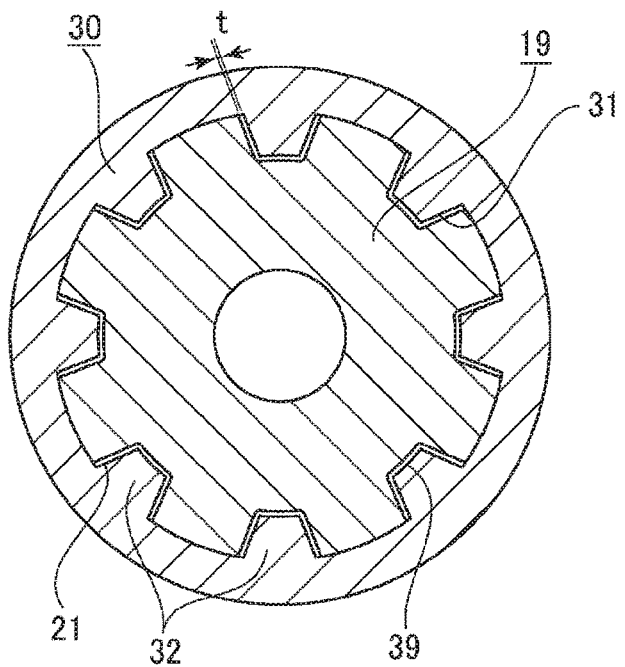
FIG. 4A is a sectional view taken along an IV-IV line of FIG. 3, and FIG. is a sectional view taken along an IV'-IV' line of FIG. 3.
Figure 4B:
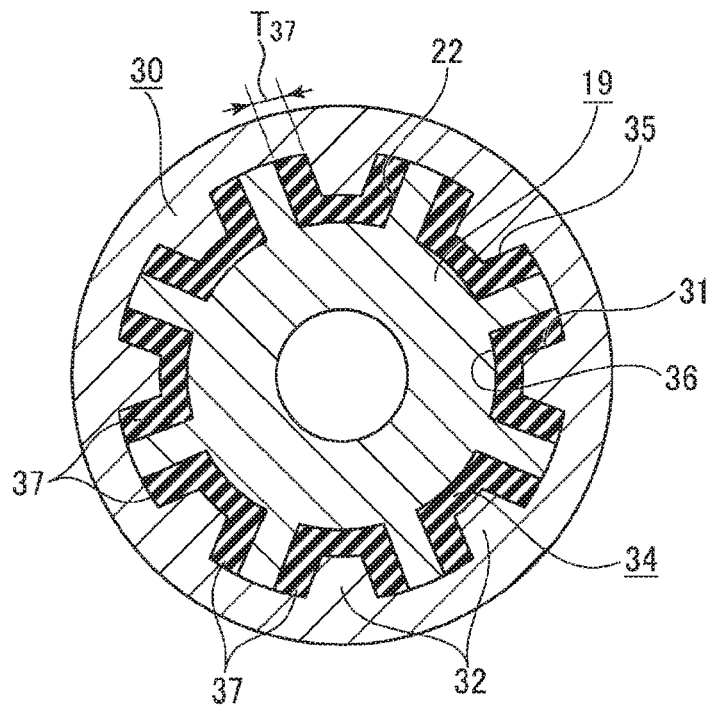

As shown in FIG. 4, in the first embodiment, a circumferential dimension $T_{37}$ of each of the circumferential wall portions 37, 37 is greater than the circumferential gap t between the coupling-side concave-convex portion 31 and the first driving-side concave-convex portion 21 and the circumferential gap between the coupling-side concave-convex portion 31 and the first driven-side concave-convex portion 27 ($T_{37}$>t). The elastic member 18 is configured to engage the outer diameter-side concave-convex portion 35 with the axially intermediate portion of the coupling-side concave-convex portion 31 of the coupling 30 without a gap and to engage one axial end portion of the inner diameter-side concave-convex portion 36 with the second driving-side concave-convex portion 22 and the other axial end portion with the second driven-side concave-convex portion 28 without a gap, respectively, in other words, the second driving-side concave-convex portion 22 and the second driven-side concave-convex portion 28 are respectively engaged with the coupling-side concave-convex portion 31 with each of the circumferential wall portions 37, 37 being interposed. Thereby, one axial half part of each of the circumferential wall portions 37, 37 is arranged to be axially adjacent to the first driving-side concave-convex portion 21 of the driving-side transmission member 19, and the other axial half part of each of the circumferential wall portions 37, 37 is arranged to be axially adjacent to the first driven-side concave-convex portion 27 of the driven-side transmission member 25.

In the meantime, a circumferential gap may be provided between the outer diameter-side concave-convex portion 35 and the coupling-side concave-convex portion 31 and between the inner diameter-side concave-convex portion 36 and the second driving-side concave-convex portion 22 and the second driven-side concave-convex portion 28, respectively. In this case, a circumferential gap between the outer diameter-side concave-convex portion 35 and the coupling-side concave-convex portion 31 and a circumferential gap between the inner diameter-side concave-convex portion 36 and the second driving-side concave-convex portion 22 (the second driven-side concave-convex portion 28) are set to be smaller than the circumferential gap between the coupling-side concave-convex portion 31 and the first driving-side concave-convex portion 21 (the first driven-side concave-convex portion 27). In any configuration, according to the first embodiment, the outer diameter-side concave-convex portion 35 is engaged with the coupling-side concave-convex portion 31, and the inner diameter-side concave-convex portion 36 is engaged with the second driving-side concave-convex portion 22 and the second driven-side concave-convex portion 28, so that one axial half part of each of the circumferential wall portions 37, 37 is sandwiched between the circumferential side surfaces of the convex portion configuring the driving-side concave-convex portion 39 (the second driving-side concave-convex portion 22) and the convex portion configuring the coupling-side concave-convex portion 31, and the other axial half part is sandwiched between the circumferential side surfaces of the convex portion configuring the driven-side concave-convex portion 40 (the second driven-side concave-convex portion 28) and the convex portion configuring the coupling-side concave-convex portion 31. That is, in the first embodiment, one axial half part of each of the circumferential wall portions 37, 37 corresponds to the driving-side elastic piece of the present invention, and the other axial half part corresponds to the driven-side elastic piece of the present invention. In the meantime, as shown with the dashed-dotted line in FIG. 8A, the coupling plate part 33 may be provided at its center portion with a through-hole 38 or a thinned portion (not shown) so as to reduce the material configuring the elastic member 18.

According to the electric power steering device of the first embodiment as described above, the first driving-side concave-convex portion 21 and the first driven-side concave-convex portion 27 are respectively engaged with the coupling-side concave-convex portion 31 with the circumferential gap being interposed therebetween, and the second driving-side concave-convex portion 22 and the second driven-side concave-convex portion 28 are respectively engaged with the coupling-side concave-convex portion 31 with the circumferential wall portions 37, 37 configuring the elastic member 18 being interposed therebetween. The circumferential dimension of each of the circumferential wall portions 37, 37 is greater than the circumferential gap between the coupling-side concave-convex portion 31 and the first driving-side concave-convex portion 21 and the circumferential gap between the coupling-side concave-convex portion 31 and the first driven-side concave-convex portion 27. Therefore, in the first embodiment, when torque to be transmitted between the output shaft 12a of the electric motor 7 and the worm shaft 6a is relatively low, rotation torque of the output shaft 12a is transmitted from the engagement portion between the second driving-side concave-convex portion 22 and the inner diameter-side concave-convex portion 36 to the elastic member 18. The torque transmitted to the elastic member 18 is transmitted from the engagement portion between the inner diameter-side concave-convex portion 36 and the second driven-side concave-convex portion 28 to the worm shaft 6a.

In contrast, when the torque to be transmitted between the output shaft 12a and the worm shaft 6a increases, the elastic member 18 is elastically deformed in the circumferential direction. That is, the circumferential wall portions 37, 37 configuring the engagement pieces 34, 34 of the elastic member 18 are elastically crushed (the circumferential width dimension is reduced). Also, the circumferential side surfaces of the convex portions configuring the coupling-side concave-convex portion 31, the circumferential side surfaces of the convex portions configuring the first driving-side concave-convex portion 21 and the circumferential side surfaces of the convex portions configuring the first driven-side concave-convex portion 27 directly collide (contact) each other. Since the collision forces are weakened by the elastic deformation of the elastic member 18, it is possible to suppress generation of an abnormal noise such as gear striking noise, which is to be caused as the collision occurs, at the contact portion between the first driving-side concave-convex portion 21 and the coupling-side concave-convex portion 31 and at the contact portion between the coupling-side concave-convex portion 31 and the first driven-side concave-convex portion 27. At this state, most of the rotation torque of the output shaft 12a is transmitted to the coupling 30 from the engagement portion between the first driving-side concave-convex portion 21 and the coupling-side concave-convex portion 31, and most of the torque transmitted to the coupling 30 is transmitted to the worm shaft 6a, from the engagement portion between the coupling-side concave-convex portion 31 and the first driven-side concave-convex portion 27.

As described above, according to the electric power steering device of the first embodiment, the torque transmission between the output shaft 12a and the worm shaft 6a is performed via the torque transmission joint 16 configured by combining the elastic member 18 and the coupling 30, so that it is possible to divide the transmission characteristic of the torque into two stages in accordance with the magnitude of the torque to be transmitted. As a result, it is possible to make an operational feeling of the steering wheel 1 (refer to FIG. 21) favorable. That is, in general, when vibration load is applied to the steering shaft 2 from wheels due to rough road surface or the like, the electric power steering device applies the torque to the worm wheel 4 fixed to the steering shaft 2. When the torque is detected by a torque sensor, a controller (not shown) generates torque in a direction of canceling the torque by the electric motor 7. Thereby, it is possible to make the operational feeling of the steering wheel 1 favorable. Herein, the worm shaft 6a having the worm teeth 5 configured to mesh with the worm wheel 4 tends to rotate by a reactive force of the torque applied to the worm wheel 4. However, when a resistance (torsional rigidity) against the relative rotation between the worm shaft 6a and the output shaft 12a of the electric motor 7 is high, a resistance against the rotation of the worm shaft 6a increases. Since the torque, which is to be applied to the worm wheel 4 based on the vibration load applied to the steering shaft 2, is relatively low, the operational feeling of the steering wheel 1 may be deteriorated when the rotation resistance of the worm shaft 6a, is high. In the first embodiment, the torque transmission between the output shaft 12a and the worm shaft 6a is performed via the torque transmission joint 16. Therefore, when the torque to be transmitted between the output shaft 12a and the worm shaft 6a, is low, the torsional rigidity can be made high, and when the torque to be transmitted is high, the torsional rigidity can be made low. Therefore, it is possible to make the operational feeling of the steering wheel 1 favorable.

In the meantime, when the circumferential gap between the coupling-side concave-convex portion 31 and the first driving-side concave-convex portion 21 is different from the circumferential gap between the coupling-side concave-convex portion 31 and the first driven-side concave-convex portion 27, or when the circumferential gap is provided between the outer diameter-side concave-convex portion 35 and the coupling-side concave-convex portion 31 and between the inner diameter-side concave-convex portion 36 and the second driving-side concave-convex portion 22 and second driven-side concave-convex portion 28, respectively, it is possible to divide the transmission characteristic of the torque between the output shaft 12a and the worm shaft 6a into more stages than the two stages.

In the first embodiment, since the driving-side concave-convex portion 39 and the driven-side concave-convex portion 40 are arranged with being axially spaced, the coupling-side concave-convex portion 31 of the coupling 30 faces the driving-side concave-convex portion 39 and the driven-side concave-convex portion 40 at axially spaced positions, respectively. Thereby, an allowance of the shaft deviation between a center axis of the worm shaft 6a and a center axis of the output shaft 12a upon assembling is increased, so that it is possible to improve the assembling property.

Further, in the first embodiment, even when the worm shaft 6a is swingably displaced or the center axis of the worm shaft 6a and the center axis of the output shaft 12a are not matched due to the eccentricity or the like, the coupling 30 is inclined relative to the center axis of the worm shaft 6a and the center axis of the output shaft 12a, so that it is possible to smoothly transmit the torque between the output shaft 12a and the worm shaft 6a. Particularly, in the first embodiment, the one axial end portions of facing circumferential surfaces of the convex portions 32, 32 configuring the coupling-side concave-convex portion 31 are inclined in the direction of separating away from each other toward the one axial side. Therefore, even when the coupling 30 is inclined relative to the center axis of the output shaft 12a, it is possible to prevent the coupling-side concave-convex portion 31 and the first driving-side concave-convex portion 21 from partially contacting (biased contact) (the circumferential side surfaces of the convex portions configuring the coupling-side concave-convex portion 31 and the first driving-side concave-convex portion 21 are surface-contacted). Therefore, it is possible to suppress the stress concentration or wear at the engagement portion between the coupling-side concave-convex portion 31 and the first driving-side concave-convex portion 21, thereby securing the durability of the torque transmission joint 16 and the entire electric power steering device.

Further, in the first embodiment, the circumferential width dimension of the convex portion of the second driving-side concave-convex portion 22 (the second driven-side concave-convex portion 28), which is to be engaged with the inner diameter-side concave-convex portion 36 of the elastic member 18, of the driving-side transmission portion 20 (the driven-side transmission portion 26) is greater than the circumferential width dimension of the convex portion of the first driving-side concave-convex portion 21 (the first driven-side concave-convex portion 27), and the outer diameter of the bottom of the concave portion configuring the second driving-side concave-convex portion 22 (the second driven-side concave-convex portion 28) is smaller than the outer diameter of the bottom of the concave portion configuring the first driving-side concave-convex portion 21 (the first driven-side concave-convex portion 27). Therefore, it is possible to secure a volume of the elastic member 18, so that it is possible to sufficiently secure the strength and durability of the elastic member 18.

Further, in the first embodiment, an interval between a tip surface of the output shaft 12a and a base end face of the worm shaft 6a is restricted by sandwiching the coupling 30 between the driving-side collar portion 23 of the driving-side transmission portion 20 and the driven-side collar portion 29 of the driven-side transmission portion 26. Therefore, it is possible to prevent the elastic member 18 from being strongly sandwiched (crushed) axially between the tip surface of the output shaft 12a and the base end face of the worm shaft 6a.

In the meantime, the elastic member 18 may be provided with a gap being interposed axially with the driving-side transmission member 19 and the driven-side transmission member 25 or may be axially compressed by the driving-side transmission member 19 and the driven-side transmission member 25.

Meanwhile, when implementing the present invention, the driving-side transmission portion 20 (the driven-side transmission portion 26) may be directly formed at the tip portion (the base end portion of the worm shaft) of the output shaft of the electric motor without interposing the driving-side transmission member 19 (the driven-side transmission member 25). The coupling-side concave-convex portion provided on the outer periphery of the coupling may be engaged with the driving-side concave-convex portion and the driven-side concave-convex portion by forming the driving-side concave-convex portion on the inner periphery of the concave portion provided at the tip portion of the output shaft of the electric motor and forming the driven-side concave-convex portion on the inner periphery of the concave portion provided at the base end portion of the worm shaft.

Second Embodiment

FIGS. 9 to 16 show a second embodiment of the present invention. A torque transmission joint 16a of the second embodiment has a driving-side transmission portion 20a, a driven-side transmission portion 26a, a coupling 30a and an elastic member 18a.

Figure 13A:
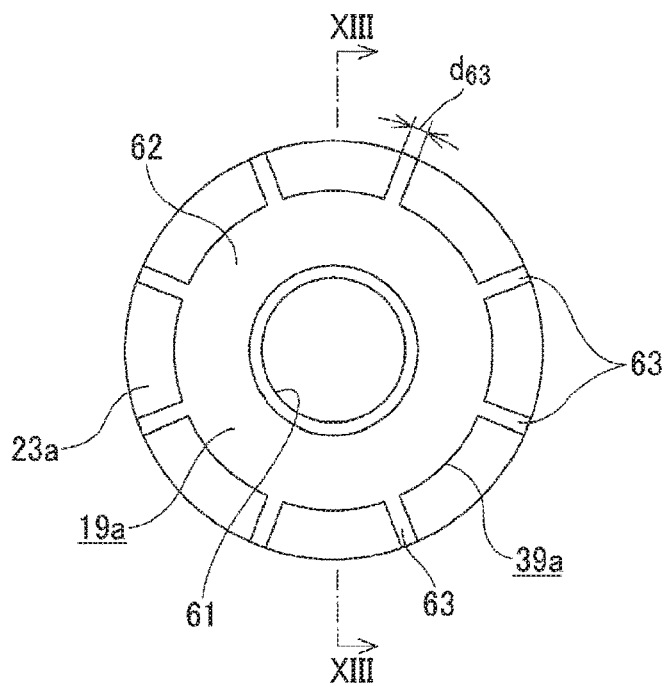
FIG. 13A is an end view showing the driving-side transmission member.
Figure 13B:
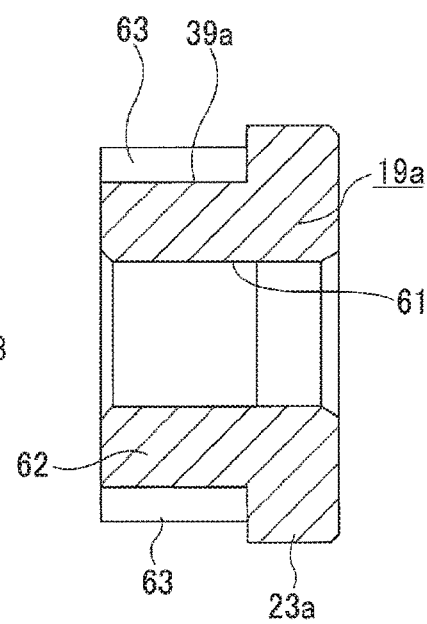
FIG. 13B is a sectional view taken along a XIII-XIII line of FIG. 13A.

The driving-side transmission portion 20a is provided at the tip portion of the output shaft main body 17 of the output shaft 12a by supporting a driving-side transmission member 19a, which is provided separately from the output shaft main body 17, by interference fit, spline fitting or the like at a state where rotation can be made in synchronization with the output shaft 12a and axial displacement relative to the output shaft 12a is restricted. As shown in FIG. 13, the driving-side transmission member 19a has a driving-side cylindrical part 62 having a driving-side engagement hole 61 formed at a center portion, a driving-side concave-convex portion 39a configured by driving-side convex portions 63, 63 provided at a plurality of circumferentially equally spaced positions of one axial end portion to an axially intermediate portion (portion except for the other axial end portion) of an outer periphery of the driving-side cylindrical part 62 and protruding radially outward (radial direction), and a circular ring-shaped driving-side collar portion 23a provided at the other axial end portion of the outer periphery of the driving-side cylindrical part 62 and continuing in the circumferential direction. That is, the driving-side engagement hole 61 of the driving-side cylindrical part 62 is externally fitted to the outer periphery of the tip portion of the output shaft main body 17 by the interference fit, spline engagement, key engagement or the like with the relative rotation being restricted (such that the torque can be transmitted).

The circumferential side surfaces of the driving-side convex portions 63, 63 configuring the driving-side concave-convex portion 39a are configured as flat surfaces parallel with each other (circumferential width dimensions of the driving-side convex portions 63, 63 are the same over the axial direction). That is, in the second embodiment, the shape of the driving-side concave-convex portion 39a (the circumferential width dimension of the convex portion and the outer diameter dimension of the bottom of the concave portion) is constant in the axial direction. However, the circumferential width dimension of the convex portion configuring the driving-side concave-convex portion 39a may be smaller toward the other axial side (the tip-side of the driving-side concave-convex portion 39a, a left side in FIG. 8) (facing circumferential side surfaces of the respective convex portions may be inclined in a direction of separating away from each other toward the other axial side).

Figure 14A:
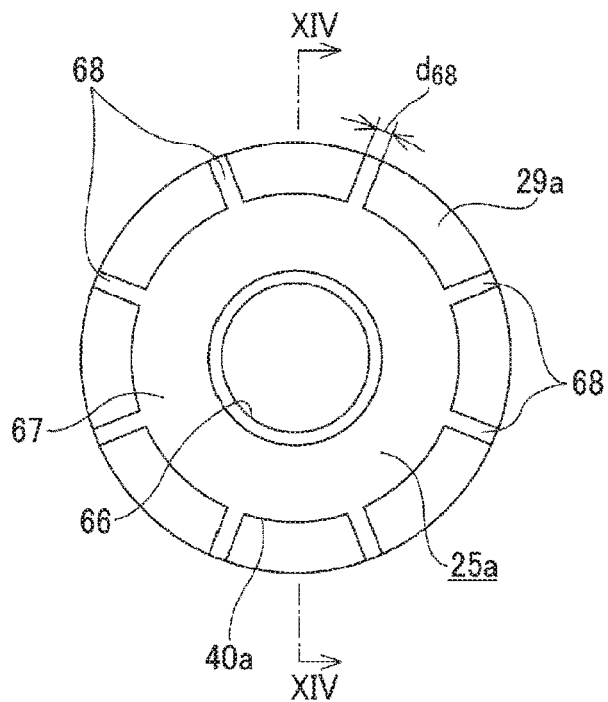
FIG. 14A is an end view showing the driven-side transmission member.
Figure 14B:
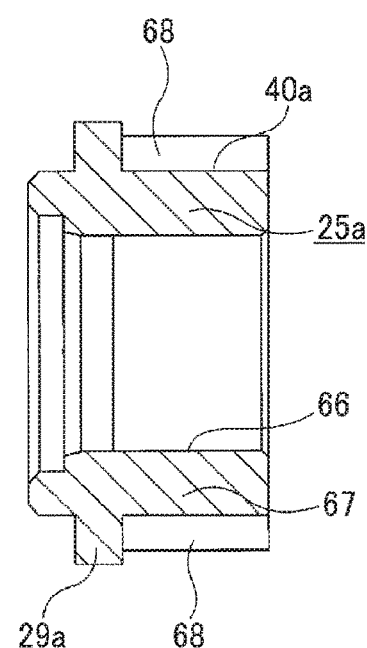
FIG. 14B is a sectional view taken along a XIV-XIV line of FIG. 14A.

The driven-side transmission portion 26a is provided at the base end portion of the worm shaft main body 24 of the worm shaft 6a by supporting a driven-side transmission member 25a, which is provided separately from the worm shaft main body 24, by interference fit, spline fitting or the like at a state where rotation can be made in synchronization with the worm shaft 6a and axial displacement relative to the worm shaft 6a is restricted. As shown in FIGS. 14A and 14B, the driven-side transmission member 25a has a driven-side cylindrical part 67 having a driven-side engagement hole 66 formed at a center portion, a driven-side concave-convex portion 40a configured by driven-side convex portions 68, 68 provided at a plurality of circumferentially equally spaced positions of other axial end portion to an axially intermediate portion (portion except for one axial end portion) of an outer periphery of the driven-side cylindrical part 67 and protruding radially outward (radial direction), and a circular ring-shaped driven-side collar portion 29a provided at one axial end portion of the outer periphery of the driven-side cylindrical part 67 and continuing in the circumferential direction. That is, the driven-side engagement hole 66 of the driven-side cylindrical part 67 is externally fitted to the outer periphery of the base end portion of the worm shaft main body 24 by the interference fit, spline engagement, key engagement or the like with the relative rotation being restricted (such that the torque can be transmitted).

In the second embodiment, circumferential side surfaces of the driven-side convex portions 68, 68 configuring the driven-side concave-convex portion 40a are configured as flat surfaces parallel with each other (circumferential width dimensions of the driven-side convex portions 68, 68 are the same over the axial direction).

Meanwhile, in the second embodiment, a shape of the driven-side concave-convex portion 40a is the same as the shape of the driving-side concave-convex portion 39a. However, the shape of the driven-side concave: convex portion 40a and the shape of the driving-side concave-convex portion 39a may be made different.

In the second embodiment, the driving-side transmission portion 20a and the driven-side transmission portion 26a are spaced axially such that the driving-side concave-convex portion 39a and the driven-side concave-convex portion 40a are arranged with being axially spaced. Also, in the second embodiment, the driving-side concave-convex portion 39a and the driven-side concave-convex portion 40a have outer diameter shapes of the substantially same dimensions.

Figure 15A:
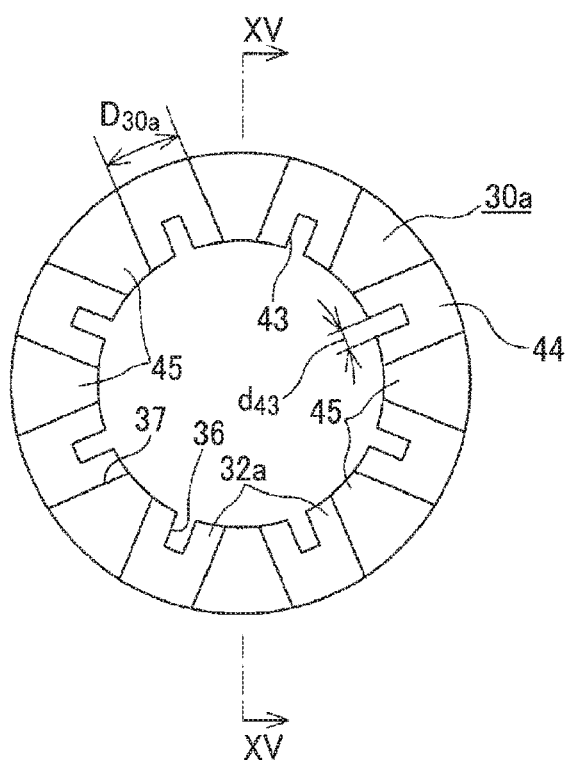
FIG. 15A is an end view showing the coupling.
Figure 15B:
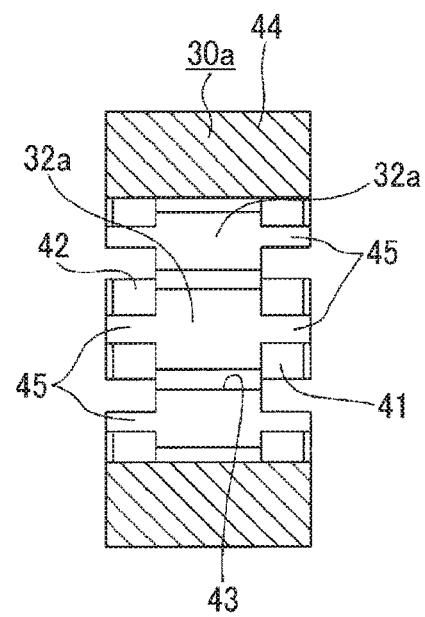
FIG. 15B is a sectional view taken along a XV-XV line of FIG. 15A.

As shown in FIGS. 15A and 15B, the coupling 30a is formed on an inner periphery with a first coupling-side concave-convex portion 41 at one axial end portion, a second coupling-side concave-convex portion 42 at the other axial end portion and a third coupling-side concave-convex portion 43 at an axially intermediate portion. That is, the coupling 30a has the third coupling-side concave-convex portion 43 formed at an axially intermediate portion of an inner periphery of a cylindrical part 44 having a cylindrical shape as a whole and protrusions 45, 45 formed at a plurality of circumferentially equally spaced positions of both axial end portions of the cylindrical part 44, configuring the first coupling-side concave-convex portion 41 (the second coupling-side concave-convex portion 42), having a fan shape as seen from the axial direction and protruding in the axial direction.

The first coupling-side concave-convex portion 41 (the second coupling-side concave-convex portion 42) is configured by convex portions, which are the protrusions 45, 45, and concave portions, which are portions between the protrusions 45, 45 adjacent in the circumferential direction, in contrast, the third coupling-side concave-convex portion 43 is configured by alternately arranging convex portions (coupling-side convex portions) 32a and concave portions in the circumferential direction. The third coupling-side concave-convex portion 43 of the coupling 30a is engaged with the other axial end portion of the driving-side concave-convex portion 39a and one axial end portion of the driven-side concave-convex portion 40a with a circumferential gap being interposed therebetween, respectively. That is, a circumferential dimension $d_{43}$ of an axially intermediate portion (at which a circumferential dimension of the concave portion is smallest) of the concave portion configuring the third coupling-side concave-convex portion 43 is greater than any of a circumferential dimension $d_{63}$ of the driving-side convex portion 63 configuring the driving-side concave-convex portion 39a and a circumferential dimension $d_{68}$ of the driven-side convex portion 68 configuring the driven-side concave-convex portion 40a ($d_{43} > d_{63} = d_{68}$). Meanwhile, in the second embodiment, at both axial end portions of the third coupling-side concave-convex portion 43, facing circumferential side surfaces of the convex portions 32a, 32a configuring the third coupling-side concave-convex portion 43 are inclined in a direction of separating away from each other toward a widthwise outer side (a width dimension between both circumferential side surfaces becomes greater toward the widthwise outer side). Thereby, the third coupling-side concave-convex portion 43, the driving-side concave-convex portion 39a and the driven-side concave-convex portion 40a are prevented from partially contacting.

The driving-side concave-convex portion 39a is arranged between the third coupling-side concave-convex portion 43 of the coupling 30a and the plurality of protrusions 45 configuring the first coupling-side concave-convex portion 41 with a radial gap being interposed therebetween, and the driven-side concave-convex portion 40a is arranged between the third coupling-side concave-convex portion 43 of the coupling 30a and the plurality of protrusions 45 configuring the second coupling-side concave-convex portion 42 with a radial gap being interposed therebetween. Meanwhile, in FIGS. 11A to 11C, respective radial gaps s1, s2 between the outer periphery of the driven-side cylindrical part 67 configuring the driven-side concave-convex portion 40a and the driven-side convex portion 68 and the third coupling-side concave-convex portion 43 of the coupling 30a and a radial gap s3 between the outer periphery of the driven-side cylindrical part 67 configuring the driven-side concave-convex portion 40a and the inner periphery of the second coupling-side concave-convex portion 42 are shown.

Figure 11A:
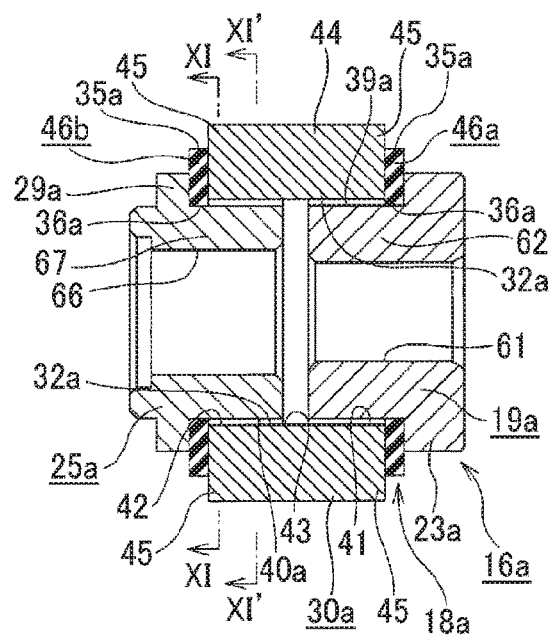
FIG. 11A is an end view showing the taken torque transmission joint.
Figure 11B:
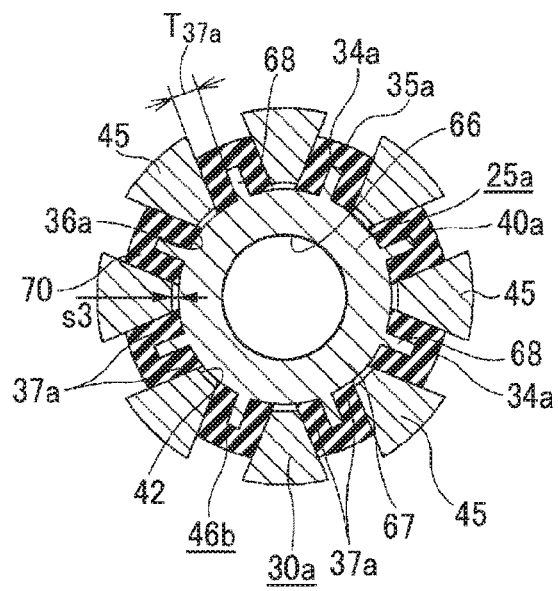
FIG. 11B is a sectional view taken along a XI-XI line of FIG. 11A.
Figure 11C:
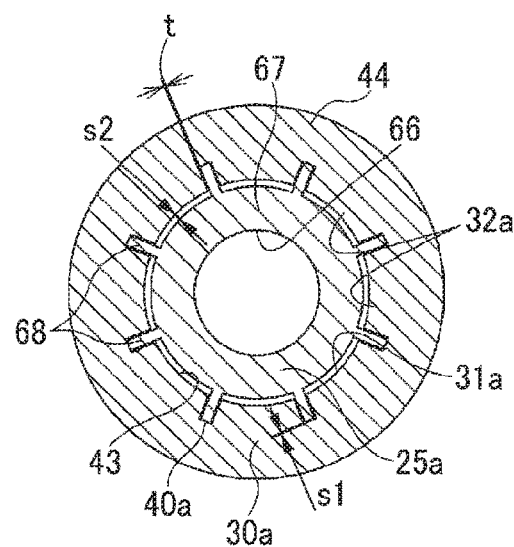
FIG. 11C is a sectional view taken along a XI'-XI' line of FIG. 11A.
Figure 12:
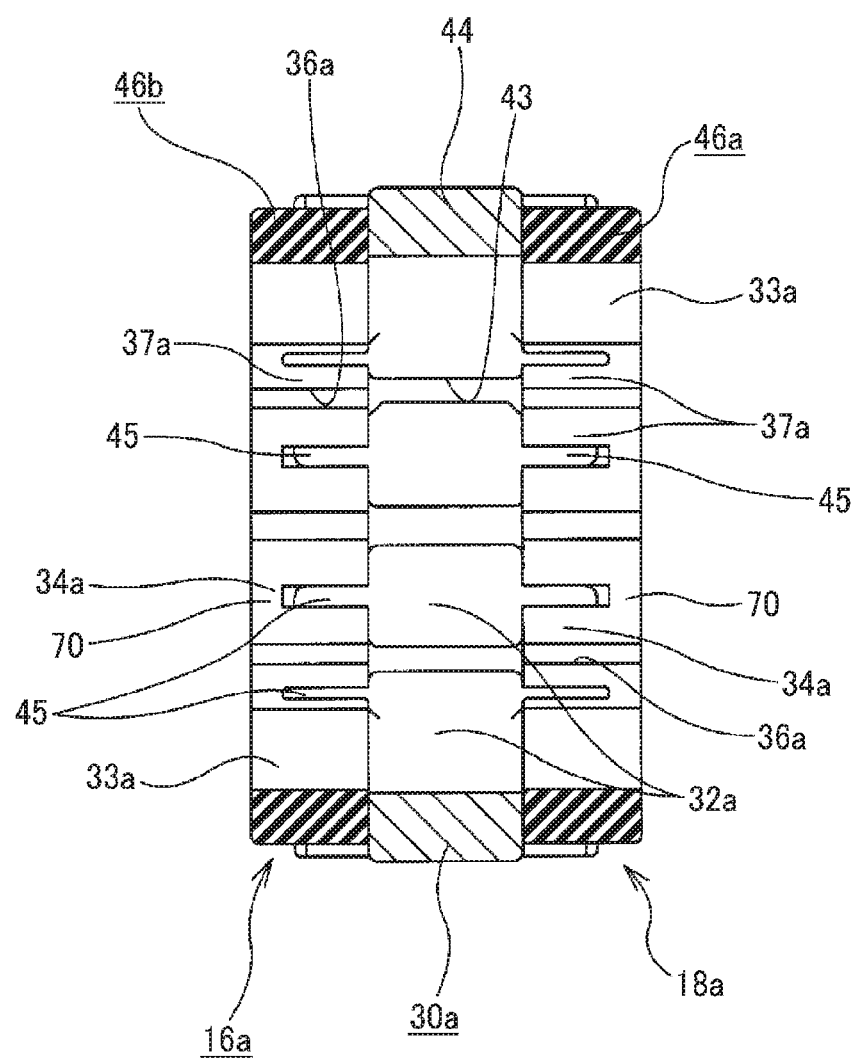
FIG. 12 is a sectional view showing a state where a pair of elastic members affixed to the coupling.
Figure 16A:
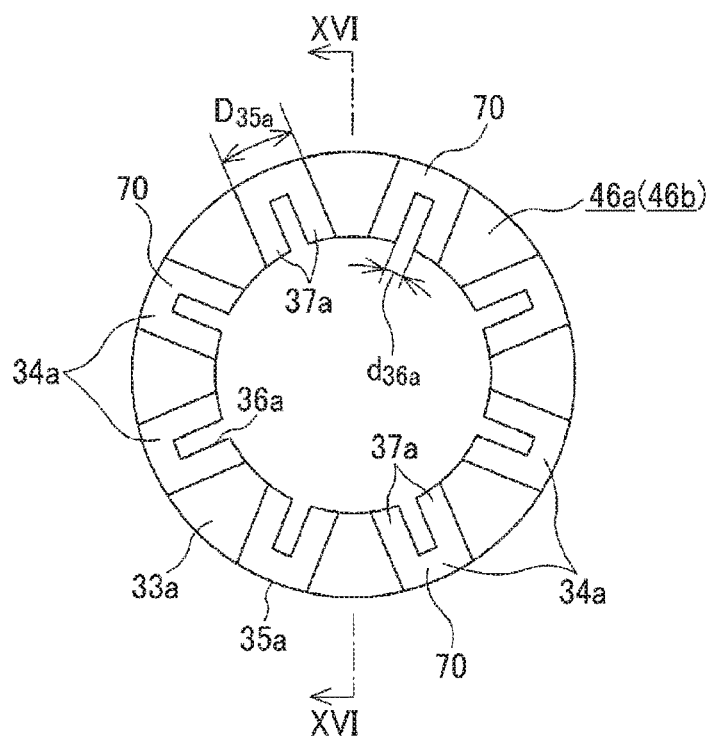
FIG. 16A is an end view showing the elastic member.
Figure 16B:
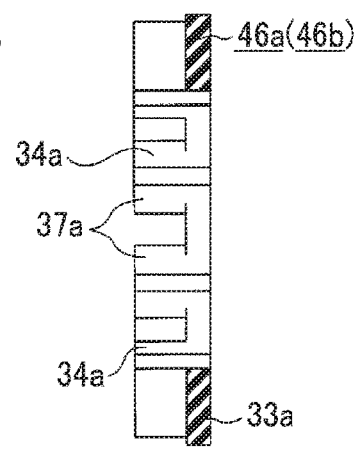
FIG. 16B is a sectional view taken along a XVI-XVI line of FIG. 16A.
Figure 17:
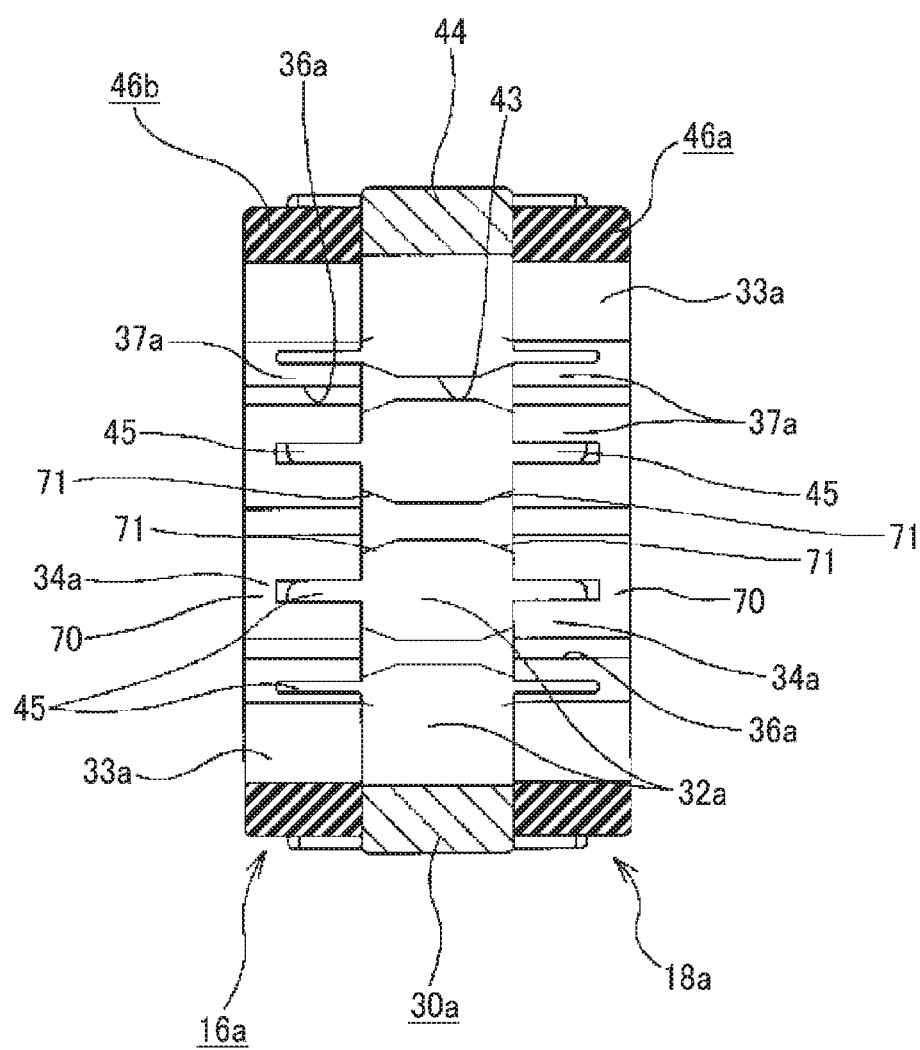
FIG. 17 is a similar view to FIG. 12, showing a modified embodiment of the second embodiment of the present invention.

The elastic member 18a is configured by a pair of elastic bodies 46a, 46b. As shown in FIGS. 16A and 16B, each elastic body 46a (46b) is provided with engagement pieces 34a, 34a having a U-shaped end face shape (an inner periphery is recessed toward a radially outer side) (the engagement piece 34a of the elastic body 46a corresponds to the driving-side elastic piece, and the engagement piece 34b of the elastic body 46b corresponds to the driven-side elastic piece) at a plurality of circumferential positions on an axial side surface of a circular ring-shaped coupling plate part 33a. Each of the engagement pieces 34a, 34a has a pair of circumferential wall portions 37a, 37a and an outer diameter-side coupling portion 70 configured to couple radially outer end portions of the circumferential wall portions 37a, 37a. The elastic body 46a. (46b) is provided with an outer diameter-side concave-convex portion 35a on an outer periphery and an inner diameter-side concave-convex portion 36a on an inner periphery. That is, the outer diameter-side concave-convex portion 35a is configured by convex portions, which are outer diameter-side portions of the respective engagement pieces 34a, 34a, and concave portion, which are portions between the adjacent engagement pieces 34a, 34a. In the meantime, the inner diameter-side concave-convex portion 36a is configured by convex portions, which are portions (portions including the pair of circumferential wall portions 37a, 37a) between inner surfaces of the circumferential wall portions 37a, 37a of the adjacent engagement pieces 34a, 34a, and concave portions, which are portions recessed toward the radially outer side of the inner peripheries of the respective engagement pieces 34a, 34a. In the second embodiment, as shown in FIGS. 11A to 11C, a circumferential dimension $T_{37a}$ of each of the circumferential wall portions 37a, 37a configuring each of the engagement pieces 34a, 34a is greater than the dimension t of the circumferential gap between the third coupling-side concave-convex portion 43 and the other axial end portion (one axial end portion of the driven-side concave-convex portion 40a) of the driving-side concave-convex portion 39a ($T_{37a}$>t). Also, referring to FIGS. 13 to 16, a circumferential dimension $D_{35a}$ of the convex portion of the outer diameter-side concave-convex portion 35a is greater than a circumferential dimension $D_{30a}$ of the concave portion configuring the first coupling-side concave-convex portion 41 and the second coupling-side concave-convex portion 42 ($D_{35a}$>$D_{30a}$), and a circumferential dimension ($d_{36a}$ of the concave portion of the inner diameter-side concave-convex portion 36a is smaller than any of the circumferential dimension $d_{63}$ of the driving-side convex portion 63 configuring the driving-side concave-convex portion 39a and the circumferential dimension $d_{68}$ of the driven-side convex portion 68 configuring the driven-side concave-convex portion 40a ($d_{36a}$<$d_{63}$=$d_{68}$).

The outer diameter-side concave-convex portion 35a of the one (right, in FIG. 11) elastic body 46a, which corresponds to the driving-side elastic body, of the elastic bodies 46a, 46b is engaged with the first coupling-side concave-convex portion 41, and the inner diameter-side concave-convex portion 36a is engaged with one axial end portion of the driving-side concave-convex portion 39a. Thereby, the circumferential wall portions 37a, 37a configuring the one elastic body 46a are sandwiched between the circumferential side surface of the driving-side convex portion 63 configuring the driving-side concave-convex portion 39a and the circumferential side surfaces of the protrusions 45, 45 provided at one axial end portion of the coupling 30a. Further, the coupling plate part 33a of the one elastic body 46a is sandwiched between the other axial side surface of the driving-side collar portion 23a and one axial end face of the coupling 30a. The outer diameter-side concave-convex portion 35a of the other (left, in FIG. 9) elastic body 46b, which corresponds to the driven-side elastic body, of the elastic bodies 46a. 46b is engaged with the second coupling-side concave-convex portion 42, and the inner diameter-side concave-convex portion 36a is engaged with the other axial end portion of the driven-side concave-convex portion 40a. Thereby, the circumferential wall portions 37a, 37a configuring the other elastic body 46b are sandwiched between the circumferential side surface of the driven-side convex portion 68 configuring the driven-side concave-convex portion 40a and the circumferential side surfaces of the protrusions 45, 45 provided at the other axial end portion of the coupling 30a. Further, the coupling plate part 33a of the other elastic body 46b is sandwiched between one axial side surface of the driven-side collar portion 29a and the other axial end face of the coupling 30a.

In the meantime, the circumferential gaps may be respectively provided between the outer diameter-side concave-convex portion 35a of the one elastic body 46a and the first coupling-side concave-convex portion 41, between the inner diameter-side concave-convex portion 36a and the driving-side concave-convex portion 39a, between the outer diameter-side concave-convex portion 35a of the other elastic body 46b and the second coupling-side concave-convex portion 42 and between the inner diameter-side concave-convex portion 36a and the driven-side concave-convex portion 40a. In this case, the circumferential gap between the outer diameter-side concave-convex portion 35a of the one elastic body 46a (the other elastic body 46b) and the first coupling-side concave-convex portion 41 (the second coupling-side concave-convex portion 42) and the circumferential gap between the inner diameter-side concave-convex portion 36a and the driving-side concave-convex portion 39a (the driven-side concave-convex portion 40a) are smaller than the circumferential gap between the third coupling-side concave-convex portion 43 and the driving-side concave-convex portion 39a (the driven-side concave-convex portion 40a).

The coupling plate part 33a of the one elastic body 46a may be axially compressed with being axially sandwiched between one axial surface of the driving-side collar portion 23a of the driving-side transmission member 19a and the other axial end face of the coupling 30a or may be provided with a gap being interposed between the other axial side surface of the driving-side collar portion 23a of the driving-side transmission member 19a and one axial end face of the coupling 30a.

Similarly, the coupling plate part 33a of the other elastic body 46b may also be axially compressed with being axially sandwiched between one axial surface the driven-side collar portion 29a of the driven-side transmission member 25a and the other axial end face of the coupling 30a or may be provided with a gap being interposed between one axial side surface of the driven-side collar portion 29a of the driven-side transmission member 25a and the other axial end face of the coupling 30a.

According to the torque transmission joint 16a of the second embodiment as described above, the third coupling-side concave-convex portion 43 is engaged with the other axial end portion of the driving-side concave-convex portion 39a and one axial end portion of the driven-side concave-convex portion 40a with the circumferential gap being interposed, respectively. Also, the first coupling-side concave-convex portion 41 is engaged with one axial end portion of the driving-side concave-convex portion 39a with the circumferential wall portions 37a, 37a configuring the one elastic body 46a being interposed therebetween, and the second coupling-side concave-convex portion 42 is engaged with the other axial end portion of the driven-side concave-convex portion 40a with the circumferential wall portions 37a, 37a configuring the other elastic body 46b being interposed therebetween. Further, the dimensions of the respective portions are defined as described above.

Therefore, when the torque to be transmitted between the output shaft of the electric motor 7 (refer to FIG. 1) and the worm shaft 6a is relatively low, the rotation torque of the output shaft 12a is transmitted from the engagement portion between the driving-side concave-convex portion 39a and the inner diameter-side concave-convex portion 36a of one elastic body 46a to the elastic body 46a and is further transmitted from the engagement portion between the outer diameter-side concave-convex portion 35a of the one elastic body 46a and the first coupling-side concave-convex portion 41 to the coupling 30a. The torque transmitted to the coupling 30a is transmitted from the engagement portion between the second coupling-side concave-convex portion 42 and the outer diameter-side concave-convex portion 35a of the other elastic body 46b to the other elastic body 46b and is further transmitted from the engagement portion between the inner diameter-side concave-convex portion 36a of the other elastic body 46b and the driven-side concave-convex portion 40a, to the worm shaft 6a.

In contrast, when the torque to be transmitted between the output shaft 12a and the worm shaft 6a increases, the circumferential wall portions 37a, 37a configuring both the elastic bodies 46a, 46b are elastically crushed in the circumferential direction. Also, the circumferential side surfaces of the convex portions 32a, 32a configuring the third coupling-side concave-convex portion 43, the circumferential side surfaces of the convex portions configuring the driving-side concave-convex portion 39a and the circumferential side surfaces of the convex portions configuring the driven-side concave-convex portion 40a directly collide (contact), respectively. At this state, most of the rotation torque of the output shaft 12a is transmitted to the coupling 30a from the engagement portion between the driving-side concave-convex portion 39a and the third coupling-side concave-convex portion 43, and most of the torque transmitted to the coupling 30a is transmitted to the worm shaft 6a from the engagement portion between the third coupling-side concave-convex portion 43 and the driven-side concave-convex portion 40a.

According to the second embodiment, similarly to the first embodiment, regarding the torque transmission between the output shaft 12a and the worm shaft 16a, it is possible to divide the transmission characteristic of the torque into two stages, in accordance with the magnitude of the torque to be transmitted. As a result, it is possible to make the operational feeling of the steering wheel 1 (refer to FIG. 9) favorable. Also, in the second embodiment, even when the worm shaft 6a is swingably displaced or the center axis of the worm shaft 6a and the center axis of the output shaft 12a are not matched due to the eccentricity or the like, the coupling 30a is inclined relative to the center axis of the worm shaft 6a and the center axis of the output shaft 12a, so that it is possible to smoothly transmit the torque between the output shaft 12a and the worm shaft 6a.

Also, in the second embodiment, the elastic member 18a is configured by the pair of elastic bodies 46a, 46b. The coupling plate part 33a configuring one elastic body 46a of the elastic bodies 46a, 46b is elastically sandwiched between the other axial side surface of the driving-side collar portion 23a and one axial end face of the coupling 30a, and the coupling plate part 33a configuring the other elastic body 46b is elastically sandwiched between one axial surface of the driven-side collar portion 29a and the other axial end face of the coupling 30a. Therefore, even when the worm shaft 6a is swingably displaced or the center axis of the worm shaft 6a and the center axis of the output shaft 12a are not matched due to the eccentricity or the like, it is possible to prevent the elastic member 18a (the elastic bodies 46a, 46b configuring the same) from being inclined relative to an axially orthogonal virtual plane.

Meanwhile, in the second embodiment, when the circumferential gap between the first coupling-side concave-convex portion 41 and the driving-side concave-convex portion 39a is made different from the circumferential gap between the second coupling-side concave-convex portion 42 and the driven-side concave-convex portion 40a, or when the elasticity of the pair of elastic bodies 46a, 46b configuring the elastic member 18a is made different from each other, it is possible to divide the transmission characteristic of the torque between the output shaft 12a and the worm shaft 6a into more stages than the two stages.

Further, the coupling 30a has the cylindrical part 44 having the third coupling-side concave-convex portion 43 formed on the inner periphery, and the plurality of protrusions 45, 45 provided at the plurality of circumferentially equally spaced positions of both axial end portions of the cylindrical part 44, protruding in the axial direction and configuring the first coupling-side concave-convex portion 41 and the second coupling-side concave-convex portion 42. Also, the driving-side elastic body 46a has the respective driving-side engagement pieces 34a provided at the plurality of circumferential positions on the axial side surface of the circular ring-shaped coupling plate part 33a, and the driven-side elastic body 46b has the respective driven-side engagement pieces 34a provided at the plurality of circumferential positions on the axial side surface of the circular ring-shaped coupling plate part 33a. The plurality of protrusions 45 configuring the first coupling-side concave-convex portion 41 and the respective driving-side engagement pieces 34a are alternately arranged over the entire circumference with the circumferential side surfaces thereof facing each other, and the plurality of protrusions 45 configuring the second coupling-side concave-convex portion 42 and the respective driven-side engagement pieces 34a are alternately arranged over the entire circumference with the circumferential side surfaces thereof facing each other. Thereby, the pair of elastic bodies 46a, 46b can easily move radially relative to the coupling 30a, and even when the center axis of the worm shaft 6a and the center axis of the output shaft 12a are not matched, it is possible to easily assemble the driving-side transmission portion 20a and the driven-side transmission portion 26a.

In the meantime, when the circumferential side surfaces of each of the engagement pieces (driving-side and driven-side elastic pieces) 34a are made to be parallel with each other as in the second embodiment, the pair of elastic bodies 46a, 46b can more easily move radially relative to the coupling 30a.

Also, the driving-side concave-convex portion 39a is arranged with the radial gap being interposed between the third coupling-side concave-convex portion 43 of the coupling 30a and the plurality of protrusions 45 configuring the first coupling-side concave-convex portion 41, and the driven-side concave-convex portion 40a is arranged with the radial gap being interposed between the third coupling-side concave-convex portion 43 of the coupling 30a and the plurality of protrusions 45 configuring the second coupling-side concave-convex portion 42. Thereby, upon the assembling, even when the center axis of the worm shaft 6a and the center axis of the output shaft 12a are not matched, it is possible to prevent the interference between the coupling 30a, and the driving-side concave-convex portion 39a and driven-side concave-convex portion 40a, respectively, and the coupling 30a, the driving-side concave-convex portion 39a and the driven-side concave-convex portion 40a, can be radially positioned via the pair of elastic bodies 46a, 46b.

The configurations and operations of the other parts are the same as the first embodiment.

Further, when implementing the present invention, the axial end portions of the facing circumferential side surfaces of the coupling-side convex portions 32a, 32a configuring the third coupling-side concave-convex portion 43 may be provided with inclined surface portions 71, which are inclined in a direction of separating away from each other in the circumferential direction toward an axial end edge of the coupling 30a, as in a modified embodiment shown in FIG.

17. By this configuration, even when the coupling 30a is inclined relative to the center axis of the output shaft 12a, it is possible to prevent the third coupling-side concave-convex portion 43 and the driving-side concave-convex portion 39a from partially contacting (biased contact) (the circumferential side surfaces of the respective coupling-side convex portions 32a, 32a and the driving-side convex portions 63, 63 are surface-contacted to each other). As a result, it is possible to suppress the stress concentration or wear at the engagement portion between the third coupling-side concave-convex portion 43 and the driving-side concave-convex portion 39a, thereby securing the durability of the torque transmission joint 16a and the entire electric power steering device. In the meantime, the inclined surface portion 71 is a planar surface but may be a curved surface.

Third Embodiment

Subsequently, the torque transmission joint according to a third embodiment of the present invention is described. In the second embodiment, the elastic bodies 46a, 46b configuring the elastic member 18a and the coupling 30a are separately assembled. However, in the third embodiment, the elastic bodies 46a, 46b are affixed to the coupling 30a. Since the other configurations are the same as the second embodiment, the descriptions are made with reference to FIGS. 9 to 16 of the second embodiment.

Specifically, in the third embodiment, the pair of elastic bodies 46a, 46b configuring the elastic member 18a is affixed to the coupling 30a by welding or adhesion using an adhesive or the like. That is, the circumferential side surfaces of the engagement pieces 34a, 34a (the circumferential wall portions 37a, 37a) configuring one elastic body 46a are affixed to the circumferential side surfaces of the protrusions 45, 45 provided at the other axial end portion of the coupling 30a. Also, one axial end faces of the engagement pieces 34a, 34a configuring one elastic body 46a are affixed to the other axial end face (portion between the protrusions 45, 45) of the coupling-side cylindrical part (cylindrical part) 44, and one axial surface (portion between the engagement pieces 34a, 34a) of the coupling plate part 33a is affixed to the other axial end faces of the protrusions 45, 45 provided at the other axial end portion of the coupling 30a. The circumferential side surfaces of the engagement pieces 34a, 34a (the circumferential wall portions 37a, 37a) configuring the other elastic body 46b are affixed to the circumferential side surfaces of the protrusions 45, 45 provided at one axial end portion of the coupling 30a, respectively. The other axial end faces of the engagement pieces 34a, 34a configuring the other elastic body 46b are affixed to one axial end face (portion between the protrusions 45, 45) of the coupling-side cylindrical part 44, and the other axial side surface (portion between the engagement pieces 34a, 34a) of the coupling plate part 33a is affixed one axial end faces of the protrusions 45, 45 provided at one axial end portion of the coupling 30a, respectively.

Thereby, it is possible to prevent the elastic member 18a and the coupling 30a from being erroneously separated, so that it is possible to make the handling property favorable, such as easy component management, and to improve the mounting ability of the elastic member 18a and the coupling 30a between the output shaft 12a and the worm 8. As a result, it is possible to save the manufacturing cost of the worm reducer. Also, when starting the torque transmission between the output shaft 12a and the worm 8 or when changing the rotational direction of the output shaft 12a, it is possible to prevent (the elastic bodies 46a, 46b configuring) the elastic member 18a and the coupling 30a from rubbing against each other and the elastic member 18a from being worn. As a result, it is possible to secure the favorable durability of the torque transmission joint 16a and the worm reducer. The configurations and operations of the other parts are the same as the second embodiment.

Meanwhile, also in the first embodiment, the elastic member 18 may be affixed to the coupling 30.

Further, the pair of elastic bodies 46a, 46b may be affixed to the coupling 30a by insert molding.

Fourth Embodiment

Figure 18A:
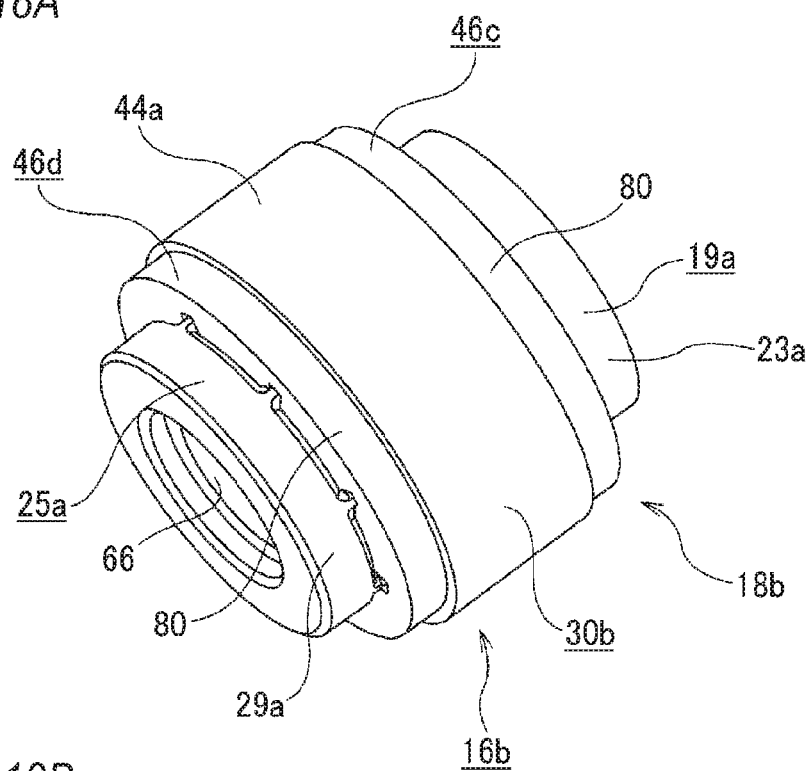
FIGS. 18A and 18B are similar views to FIGS. 10A and 10B, showing a torque transmission joint of a fourth embodiment of the present invention.
Figure 18B:
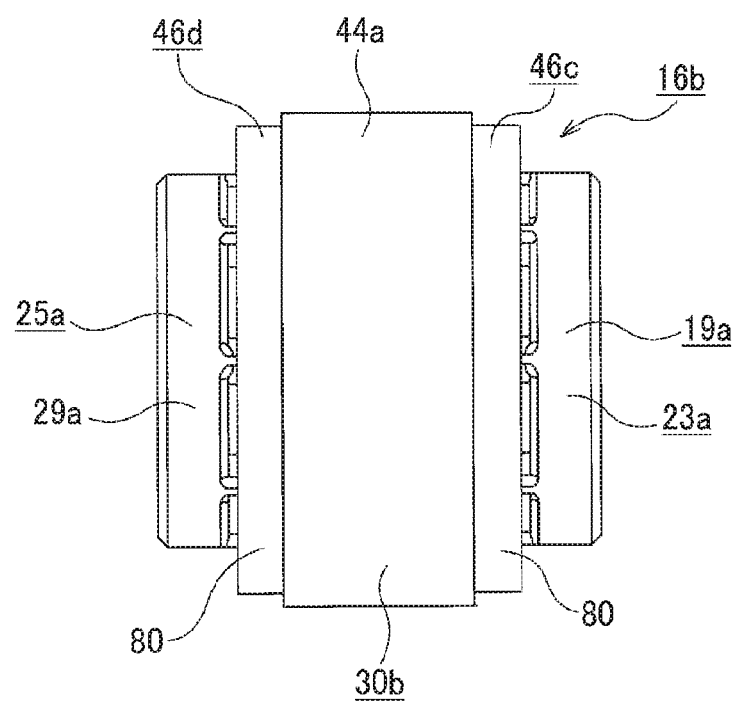
Figure 19:
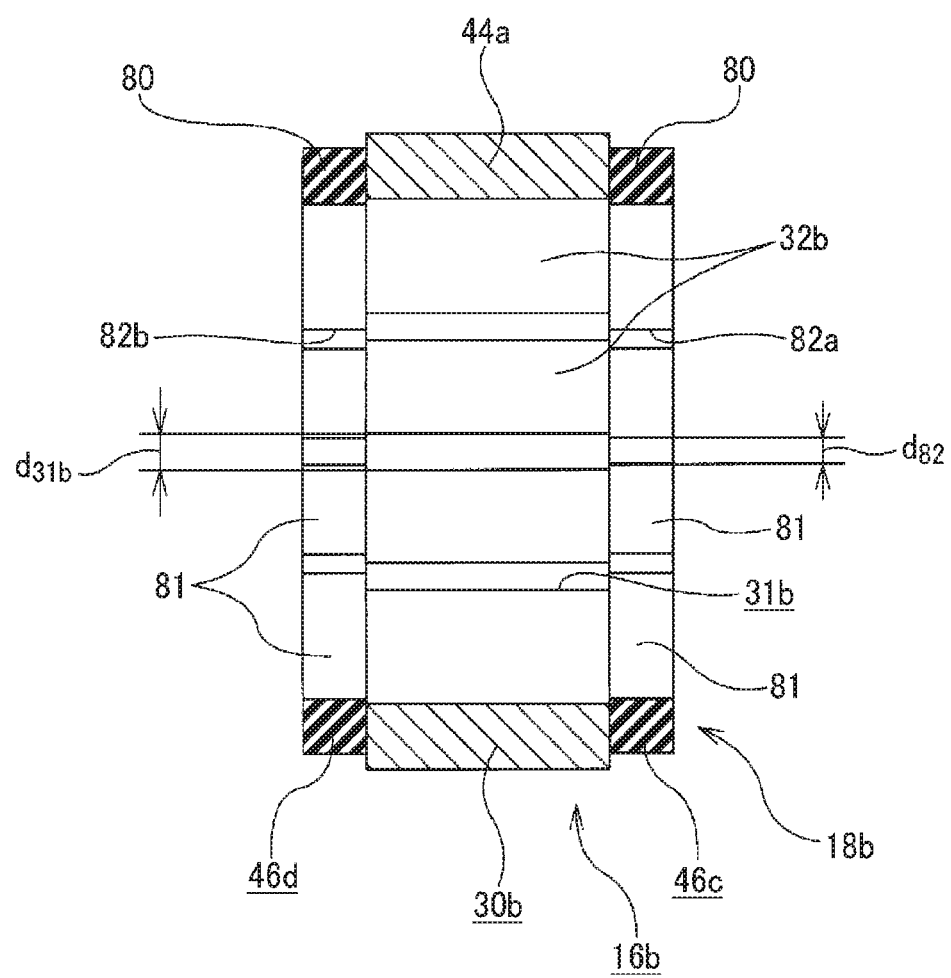
FIG. 19 is a similar view to FIG. 12, showing the torque transmission joint of FIGS. 18A and 18B.

FIGS. 18 and 19 show a fourth embodiment of the present invention. A torque transmission joint 16b of the fourth embodiment has the driving-side transmission member 19a, the driven-side transmission member 25a, a coupling 30b and an elastic member 18b. The coupling 30b has a coupling-side cylindrical part 44a, and a coupling-side concave-convex portion 31b made by forming coupling-side convex portions 32b, 32b protruding radially inward over an entire axial width of the coupling-side cylindrical part 44a at a plurality of circumferentially equally spaced positions on an inner periphery of the coupling-side cylindrical part 44a. In the meantime, a circumferential dimension $d_{31b}$ of the concave portion between the coupling-side convex portions 32b, 32b configuring the coupling-side concave-convex portion 31b is greater than any of the circumferential dimension $d_{63}$ (refer to FIG. 13) of each of the driving-side convex portions 63, 63 configuring the driving-side concave-convex portion 39a and the circumferential dimension $d_{68}$ (refer to FIGS. 14A and 14B) of each of the driven-side convex portions 68, 68 configuring the driven-side concave-convex portion 40a ($d_{31b} > d_{63} = d_{68}$).

The elastic member 18b is configured by a pair of elastic bodies 46c, 46d. Each elastic body 46c (46d) has an elastic body-side cylindrical part 80, and an elastic body-side concave-convex portion 82a (82b) made by forming elastic body-side convex portions 81, 81 protruding radially inward at a plurality of circumferentially equally spaced positions on an inner periphery of the elastic body-side cylindrical part 80. In the meantime, a circumferential dimension $d_{82}$ of the concave portion between the elastic body-side convex portions 81, 81 configuring the elastic body-side concave-convex portion 82a (82b) is equal to or slightly smaller than the circumferential dimension $d_{63}$ of each of the driving-side convex portions 63, 63 and the circumferential dimension $d_{68}$ of each of the driven-side convex portions 68, 68 ($d_{82} \leq d_{63} = d_{68}$). In the fourth embodiment, one axial end face of one elastic body 46c of the elastic bodies 46c, 46d is affixed to the other axial end face of the coupling 30b, and the other axial end face of the other elastic body 46d is affixed to one axial end face of the coupling 30b.

In the fourth embodiment, the other axial half part of the driving-side concave-convex portion 39a configuring the driving-side transmission member 19a supported and fixed to the tip portion of the output shaft 12a (refer to FIGS. 1 to 3) is engaged with the elastic body-side concave-convex portion 82a of one elastic body 46c without circumferential rattling, and one axial half part of the driving-side concave-convex portion 39a is engaged with the other axial half part of the coupling-side concave-convex portion 31b of the coupling 30b with a circumferential gap being interposed therebetween. One axial half part of the driven-side concave-convex portion 40a configuring the driven-side transmission member 25a supported and fixed to the base end portion of the worm 8 (refer to FIGS. 1 to 3) is engaged with the elastic body-side concave-convex portion 82b of the other elastic body 46d without circumferential rattling, and the other axial half part of the driven-side concave-convex portion 40a is engaged with one axial half part of the coupling-side concave-convex portion 31b with a circumferential gap being interposed therebetween.

According to the fourth embodiment, when the torque to be transmitted between the output shaft 12a and the worm 8 is relatively low, the rotation torque of the output shaft 12a is transmitted from the engagement portion between the driving-side concave-convex portion 39a of the driving-side transmission member 19a and the elastic body-side concave-convex portion 82a of one elastic body 46c to the one elastic body 46c, and is further transmitted from the affixed portion between one axial end face of the one elastic body 46c and the other axial end face of the coupling 30b to the coupling 5ob. The torque transmitted to the coupling 30b is transmitted from the affixed portion between one axial end face of the coupling 30b and the other axial end face of the other elastic body 46d to the other elastic body 46d and is further transmitted from the engagement portion between the elastic body-side concave-convex portion 50b of the other elastic body 46d and the driven-side concave-convex portion 40a of the driven-side transmission member 25a to the worm 8.

In contrast, when the torque to be transmitted between the output shaft 12a and the worm 8 increases, the elastic body-side convex portions 81, 81 configuring the elastic bodies 46c, 46d are elastically crushed in the circumferential direction. Also, the circumferential side surfaces of the coupling-side convex portions 32b, 32b configuring the coupling-side concave-convex portion 31b, the circumferential side surfaces of the driving-side convex portions 63, 63 configuring the driving-side concave-convex portion 39a, and the circumferential side surfaces of the driven-side convex portions 68, 68 configuring the driven-side concave-convex portion 40a directly collide (contact). At this state, most of the rotation torque of the output shaft 12a is transmitted to the coupling 30b from the engagement portion between the driving-side concave-convex portion 39a and the coupling-side concave-convex portion 31b, and most of the torque transmitted to the coupling 30b is transmitted to the worm shaft 8 from the engagement portion between the coupling-side concave-convex portion 31b and the driven-side concave-convex portion 40a.

According to the fourth embodiment, similarly to the second and third embodiments, regarding the torque transmission between the output shaft 12a and the worm shaft 8, it is possible to divide the transmission characteristic of the torque into two stages in accordance with the magnitude of the torque to be transmitted. As a result, it is possible to make the operational feeling of the steering wheel 1 (refer to FIG. 21) favorable. Also, even when the worm shaft 8 is swingably displaced or the center axis of the worm shaft 8 and the center axis of the output shaft 12a are not matched due to the eccentricity or the like, the coupling 30b is inclined relative to at least one of the center axes of the worm shaft 8 and the output shaft 12a, so that it is possible to smoothly transmit the torque between the output shaft 12a and the worm shaft 8.

Also, in the fourth embodiment, the axial end faces of both the elastic bodies 46c, 46d are affixed to the axial end face of the coupling 30b. Therefore, it is possible to facilitate the affixing operation of the elastic bodies 46c, 46d and the coupling 30b, as compared to the configuration where the elastic body 46a (46b) and the coupling 30a are affixed with the outer diameter-side concave-convex portion 35a of the elastic body 46a (46b) being engaged with the first coupling-side concave-convex portion 41 (the second coupling-side concave-convex portion 42) of the coupling 30a, similarly to the third embodiment.

The configurations and operations of the other parts are the same as the third embodiment.

Modified Embodiments

Figure 20:
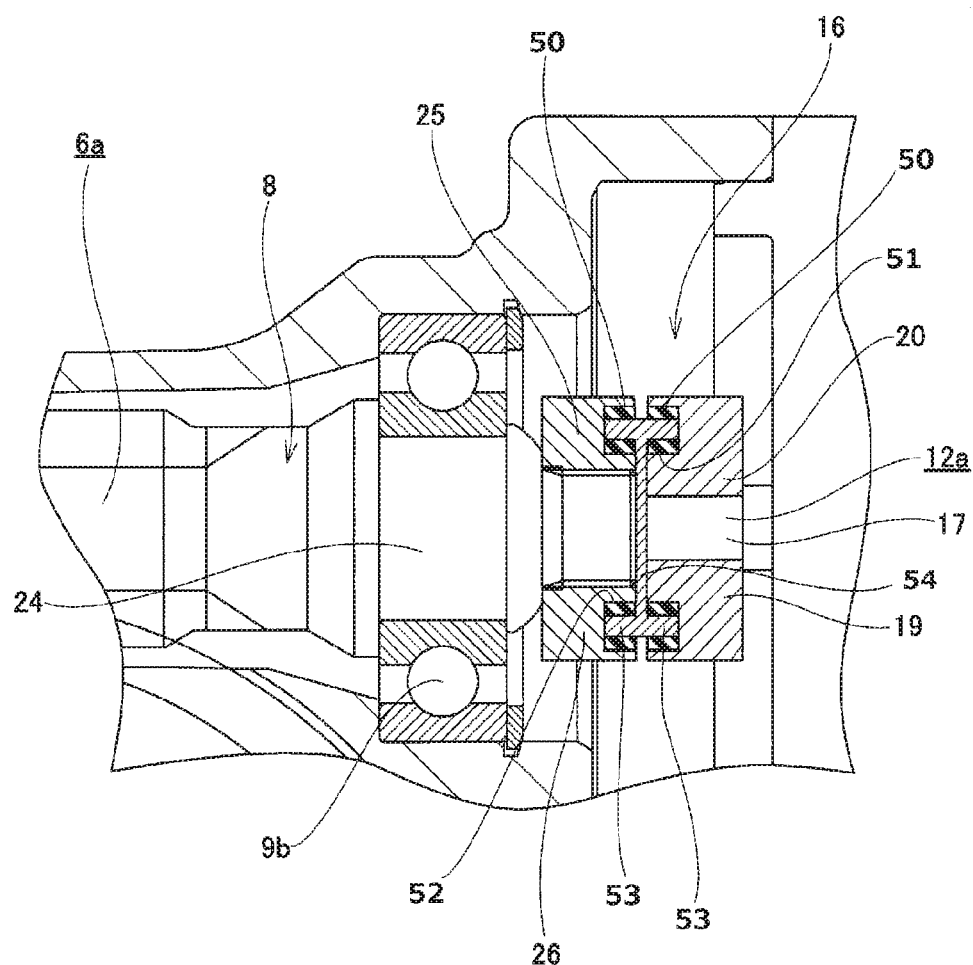
FIG. 20 is a similar view to FIG. 3, showing a modified embodiment of the embodiments of the present invention.

FIG. 20 shows a modified embodiment of the embodiments. In FIG. 20, a reference numeral 54 indicates a transmission portion coupling member of which outer edge portions of both surfaces of a disc-shaped plate part are provided with six pins 53 with an equal interval on the same circumference. A motor-side end face of the driven-side transmission member 25 is provided with six driven-side pin insertion holes 52 at positions corresponding to the pins 53, and a worm shaft-side end face of the driving-side transmission member 19 is provided with six driving-side pin insertion holes 51 at positions corresponding to the pins 53. In the driven-side pin insertion hole 52 and the driving-side pin insertion hole 51, a tube-shaped elastic member 50 is fitted. In through-holes of the elastic member 50, the pins 53 of the transmission portion coupling member 54 are respectively fitted.

Also in the configuration of the modified embodiment, it is possible to realize the same operations and effects as the above embodiments.

The present application is based on a Japanese Patent Application No. 2014-196240 filed on Sep. 26, 2014, a Japanese Patent Application No. 2014-265909 filed on Dec. 26, 2014, a Japanese Patent Application No. 2015-24871 filed on Feb. 12, 2015, a Japanese Patent Application No. 2015-92092 filed on Apr. 28, 2015, a Japanese Patent Application No. 2015-172536 filed on Sep. 2, 2015, and International Patent Application No, PCT/JP2015/062569 filed on Apr. 24, 2015, the contents all of which are incorporated herein by reference.

DESCRIPTION OF REFERENCE NUMERALS

1: steering wheel
2: steering shaft
3: housing
4: worm wheel
5: worm teeth
6, 6a: worm shaft
7: electric motor
8: worm
9a, 9b: rolling bearing
10: pressing piece
11: coil spring
12, 12a: output shaft
13: spline hole
14: spline shaft portion
15: preload applying mechanism
16: torque transmission joint
17: output shaft main body
18, 18a: elastic member
19, 19a: driving-side transmission member
20, 20a: driving-side transmission portion
21: first driving-side concave-convex portion
22: second driving-side concave-convex portion
23, 23a: driving-side collar portion
24: worm shaft main body
25, 25a: driven-side transmission member
26, 26a: driven-side transmission portion
27: first driven-side concave-convex portion 28: second driven-side concave-convex portion
29, 29a: driven-side collar portion
30, 30a: coupling
31: coupling-side concave-convex portion
32, 32a: convex portion
33, 33a: coupling plate part
34, 34a: engagement piece
35, 35a: outer diameter-side concave-convex portion
36, 36a: inner diameter-side concave-convex portion
37, 37a: circumferential wall portion
38: through-hole
39, 39a: driving-side concave-convex portion
40, 40a: driven-side concave-convex portion
41: first coupling-side concave-convex portion
42: second coupling-side concave-convex portion
43: third coupling-side concave-convex portion
44: cylindrical part
45: protrusion
46a, 46b: elastic body
50: elastic member
51: driving-side pin insertion hole
52: driven-side pin insertion hole
53: pin
54: transmission portion coupling member
61: driving-side engagement hole
62: driving-side cylindrical part
63: driving-side convex portion
66: driving-side engagement hole
67: driving-side cylindrical part
68: driven-side convex portion

The invention claimed is:

1. A torque transmission joint configured to transmit torque between end portions of a driving shaft and a driven shaft arranged in series in an axial direction, the torque transmission joint comprising:
a coupling including a coupling-side concave-convex portion which is formed by alternately arranging concave portions and convex portions over an entire circumference on one of inner and outer peripheries;
an elastic member made of an elastic material and including driving-side elastic pieces which are provided at a plurality of circumferential positions, and driven-side elastic pieces which are provided at a plurality of circumferential positions;
a driving-side transmission portion including a driving-side concave-convex portion which is provided at the end portion of the driving shaft either directly or via another member and which is formed by alternately arranging concave portions and convex portions over an entire circumference on one of inner and outer peripheries, which faces the coupling-side concave-convex portion; and
a driven-side transmission portion including a driven-side concave-convex portion which is provided at the end portion of the driven shaft either directly or via another member and which is formed by alternately arranging concave portions and convex portions over an entire circumference on one of inner and outer peripheries, which faces the coupling-side concave-convex portion,
wherein the driving-side concave-convex portion and the driven-side concave-convex portion are arranged with being axially spaced,
wherein one axial portion of the driving-side concave-convex portion is engaged with the coupling-side concave-convex portion with a circumferential gap being interposed therebetween, and an axially remaining portion of the driving-side concave-convex portion is engaged with the coupling-side concave-convex portion with each of the driving-side elastic pieces being interposed therebetween,
wherein one axial portion of the driven-side concave-convex portion is engaged with the coupling-side concave-convex portion with a circumferential gap being interposed therebetween, and an axially remaining portion of the driven-side concave-convex portion is engaged with the coupling-side concave-convex portion with each of the driven-side elastic pieces being interposed therebetween,
wherein the coupling-side concave-convex portion includes a first coupling-side concave-convex portion which is formed at one axial end portion, a second coupling-side concave-convex portion which is formed at the other axial end portion, and a third coupling-side concave-convex portion which is formed at an axially intermediate portion,
wherein the first coupling-side concave-convex portion is engaged with a portion of the driving-side concave-convex portion between one axial end portion and an intermediate portion thereof with each of the driving-side elastic pieces being interposed therebetween,
wherein the second coupling-side concave-convex portion is engaged with a portion of the driven-side concave-convex portion between another axial end portion to an intermediate portion thereof with each of the driven-side elastic pieces being interposed therebetween, and
wherein one axial end portion of the third coupling-side concave-convex portion is engaged with the other axial end portion of the driving-side concave-convex portion with a circumferential gap being interposed therebetween, and the other axial end portion of the third coupling-side concave-convex portion is engaged with one axial end portion of the driven-side concave-convex portion with a circumferential gap being interposed therebetween.

2. The torque transmission joint according to claim 1, wherein a circumferential dimension of each of the driving-side elastic pieces is greater than a circumferential gap between the one axial portion of the driving-side concave-convex portion and the coupling-side concave-convex portion, and
wherein a circumferential dimension of each of the driven-side elastic pieces is greater than a circumferential gap between the one axial portion of the driven-side concave-convex portion and the coupling-side concave-convex portion.

3. The torque transmission joint according to claim 1, wherein the elastic member includes a driving-side elastic body which has each of the driving-side elastic pieces, and a driven-side elastic body which has each of the driven-side elastic pieces, the driving-side elastic body and the driven-side elastic body being separate bodies.

4. The torque transmission joint according to claim 3, wherein the coupling includes:
a cylindrical part including the third coupling-side concave-convex portion which is formed on an inner periphery thereof; and
a plurality of protrusions which are provided at a plurality of circumferentially equally spaced positions of both axial end portions of the cylindrical part and protrude in the axial direction to configure each of the first coupling-side concave-convex portion and the second coupling-side concave-convex portion, wherein the driving-side elastic body includes the driving-side elastic pieces provided at a plurality of circumferential positions of an axial side surface of a circular ring-shaped coupling plate part,
wherein the driven-side elastic body includes the driven-side elastic pieces provided at a plurality of circumferential positions of an axial side surface of a circular ring-shaped coupling plate part,
wherein the plurality of protrusions configuring the first coupling-side concave-convex portion and the driving-side elastic pieces are alternately arranged over an entire circumference with circumferential side surfaces thereof facing each other, and
wherein the plurality of protrusions configuring the second coupling-side concave-convex portion and the driven-side elastic pieces are alternately arranged over an entire circumference with circumferential side surfaces thereof facing each other.

5. The torque transmission joint according to claim 4,
wherein the driving-side concave-convex portion is arranged to have a radial gap with the third coupling-side concave-convex portion of the coupling and with the plurality of protrusions configuring the first coupling-side concave-convex portion, and
wherein the driven-side concave-convex portion is arranged to have a radial gap with the third coupling-side concave-convex portion of the coupling and with the plurality of protrusions configuring the second coupling-side concave-convex portion.

6. The torque transmission joint according to claim 3,
wherein the driving-side elastic body includes the driving-side elastic pieces provided at a plurality of circumferential positions of an axial side surface of a circular ring-shaped coupling plate part,
wherein the driven-side elastic body includes the driven-side elastic pieces provided at a plurality of circumferential positions of an axial side surface of a circular ring-shaped coupling plate part,
wherein the coupling plate part of the driving-side elastic body is arranged between an axial side surface of the driving-side transmission portion and one axial end face of the coupling, and
wherein the coupling plate part of the driven-side elastic body is arranged between an axial side surface of the driven-side transmission portion and the other axial end face of the coupling.

7. The torque transmission joint according to claim 1,
wherein at least at one end portion of both axial end portions of the third coupling-side concave-convex portion, facing circumferential side surfaces of the convex portions configuring the third coupling-side concave-convex portion are inclined in a direction of separating away from each other toward an end edge of the third coupling-side concave-convex portion.

8. The torque transmission joint according to claim 1, wherein the elastic member is affixed to the coupling.

9. The torque transmission joint according to claim 8,
wherein the elastic member includes a driving-side elastic body which has each of the driving-side elastic pieces, and a driven-side elastic body which has each of the driven-side elastic pieces, the driving-side elastic body and the driven-side elastic body being separate bodies, and
wherein the driving-side elastic body is affixed to another axial end portion of the coupling and the driven-side elastic body is affixed to one axial end portion of the coupling.

10. An electric power steering device comprising:
a non-rotatable housing which is supported to a fixed part;
a steering rotary shaft which is provided to be rotatable relative to the housing and configured to be rotated by an operation of a steering wheel and to apply a steering angle to steered wheels according to the rotation;
a worm wheel which is supported to a part of the steering rotary shaft concentrically with the steering rotary shaft in the housing and configured to rotate together with the steering rotary shaft;
a worm which includes worm teeth provided on an axially intermediate portion of a worm shaft, wherein axial end portions of the worm shaft are respectively rotatably supported to the housing by bearings with the worm teeth being meshed with the worm wheel; and
an electric motor which is configured to rotate the worm,
wherein an output shaft of the electric motor and the worm shaft are connected by a torque transmission joint such that torque can be transmitted, and
wherein the torque transmission joint is the torque transmission joint according to claim 1.

11. A torque transmission joint configured to transmit torque between end portions of a driving shaft and a driven shaft arranged in series in an axial direction, the torque transmission joint comprising:
a coupling including a coupling-side concave-convex portion which is formed by alternately arranging concave portions and convex portions over an entire circumference on one of inner and outer peripheries;
an elastic member made of an elastic material and including driving-side elastic pieces which are provided at a plurality of circumferential positions, and driven-side elastic pieces which are provided at a plurality of circumferential positions;
a driving-side transmission portion including a driving-side concave-convex portion which is provided at the end portion of the driving shaft either directly or via another member and which is formed by alternately arranging concave portions and convex portions over an entire circumference on one of inner and outer peripheries, which faces the coupling-side concave-convex portion; and
a driven-side transmission portion including a driven-side concave-convex portion which is provided at the end portion of the driven shaft either directly or via another member and which is formed by alternately arranging concave portions and convex portions over an entire circumference on one of inner and outer peripheries, which faces the coupling-side concave-convex portion,
wherein the driving-side concave-convex portion and the driven-side concave-convex portion are arranged with being axially spaced,
wherein one axial portion of the driving-side concave-convex portion is engaged with the coupling-side concave-convex portion with a circumferential gap being interposed therebetween, and an axially remaining portion of the driving-side concave-convex portion is engaged with the coupling-side concave-convex portion with each of the driving-side elastic pieces being interposed therebetween,
wherein one axial portion of the driven-side concave-convex portion is engaged with the coupling-side concave-convex portion with a circumferential gap being interposed therebetween, and an axially remaining portion of the driven-side concave-convex portion is engaged with the coupling-side concave-convex portion with each of the driven-side elastic pieces being interposed therebetween, wherein the driving-side concave-convex portion includes a first driving-side concave-convex portion formed at one axial half part, and a second driving-side concave-convex portion formed at the other axial half part, the first driving-side concave-convex portion is engaged with one axial end portion of the coupling-side concave-convex portion with a circumferential gap being interposed therebetween, and the second driving-side concave-convex portion is engaged with one axial end side portion of the coupling-side concave-convex portion with each of the driving-side elastic pieces being interposed therebetween, and wherein the driven-side concave-convex portion includes a first driven-side concave-convex portion formed at another axial half part, and a second driven-side concave-convex portion formed at one axial half part, the first driven-side concave-convex portion is engaged with another axial end portion of the coupling-side concave-convex portion with a circumferential gap being interposed therebetween, and the second driven-side concave-convex portion is engaged with another axial end side portion of the coupling-side concave-convex portion with each of the driven-side elastic pieces being interposed therebetween.

12. The torque transmission joint according to claim 11, wherein the elastic member integrally includes the driving-side elastic pieces and the driven-side elastic pieces.

13. An electric power steering device comprising:

a non-rotatable housing which is supported to a fixed part;

a steering rotary shaft which is provided to be rotatable relative to the housing and configured to be rotated by an operation of a steering wheel and to apply a steering angle to steered wheels according to the rotation;

a worm wheel which is supported to a part of the steering rotary shaft concentrically with the steering rotary shaft in the housing and configured to rotate together with the steering rotary shaft;

a worm which includes worm teeth provided on an axially intermediate portion of a worm shaft, wherein axial end portions of the worm shaft are respectively rotatably supported to the housing by bearings with the worm teeth being meshed with the worm wheel; and an electric motor which is configured to rotate the worm, wherein an output shaft of the electric motor and the worm shaft are connected by a torque transmission joint such that torque can be transmitted, and wherein the torque transmission joint is the torque transmission joint according to claim 11.

* * * * *